(12) United States Patent
Akkarakaran et al.

(10) Patent No.: US 11,711,168 B2
(45) Date of Patent: Jul. 25, 2023

(54) METHODS AND APPARATUS TO FACILITATE A HARQ FLUSH INDICATOR FOR TRANSMISSIONS

(71) Applicant: QUALCOMM Incorporated, San Diego, CA (US)

(72) Inventors: Sony Akkarakaran, Poway, CA (US); Tao Luo, San Diego, CA (US); Junyi Li, Franklin Park, NJ (US); Jung Ho Ryu, Fort Lee, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/232,007

(22) Filed: Apr. 15, 2021

(65) Prior Publication Data

US 2021/0328723 A1 Oct. 21, 2021

Related U.S. Application Data

(60) Provisional application No. 63/012,027, filed on Apr. 17, 2020.

(51) Int. Cl.
*H04L 1/1607* (2023.01)
*H04L 5/00* (2006.01)

(52) U.S. Cl.
CPC .......... *H04L 1/1621* (2013.01); *H04L 1/1671* (2013.01); *H04L 5/0055* (2013.01)

(58) Field of Classification Search
CPC . H04L 1/1621; H04L 1/16711; H04L 5/0055; H04L 5/0007; H04L 5/0048;

(Continued)

(56) References Cited

U.S. PATENT DOCUMENTS

2018/0145797 A1 5/2018 Yeo et al.
2019/0074929 A1* 3/2019 Aiba .................. H04W 72/042

(Continued)

FOREIGN PATENT DOCUMENTS

| EP | 3621230 A1 | 3/2020 |
| WO | 2018143857 A1 | 8/2018 |
| WO | 2020005125 A1 | 1/2020 |

OTHER PUBLICATIONS

International Search Report and Written Opinion—PCT/US2021/027783—ISA/EPO—dated Jul. 26, 2021.

(Continued)

*Primary Examiner* — Abdullahi Ahmed
(74) *Attorney, Agent, or Firm* — Danai Nelisile Mhembere

(57) ABSTRACT

Apparatus, methods, and computer-readable media for facilitating a HARQ flush indicator for transmissions are disclosed herein. An example method for wireless communication at a first sidelink device includes transmitting a sidelink transmission of one or more CBs using code block groups, each code block group including one or more CBs of the sidelink transmission. The example method also includes receiving negative feedback for at least one CB of the sidelink transmission. Additionally, the example method includes retransmitting the at least one CB. The example method also includes transmitting an FI indicating to avoid combining a prior sidelink transmission of the at least one CB with a retransmission of the at least one CB.

30 Claims, 16 Drawing Sheets

(58) Field of Classification Search
CPC ... H04L 5/0051; H04L 5/0053; H04L 5/0094; H04L 1/1861; H04L 1/1896; H04L 1/1845; H04L 1/1835
See application file for complete search history.

(56) References Cited

U.S. PATENT DOCUMENTS

| | | | | |
|---|---|---|---|---|
| 2021/0006318 A1* | 1/2021 | Kim | .................... | H04L 1/1812 |
| 2021/0212086 A1* | 7/2021 | Li | .................... | H04W 72/14 |
| 2021/0320755 A1* | 10/2021 | Faxer | .................... | H04W 72/042 |
| 2022/0174682 A1* | 6/2022 | Li | .................... | H04W 72/10 |
| 2022/0240289 A1* | 7/2022 | Karaki | .................... | H04L 5/0055 |

OTHER PUBLICATIONS

3GPP TS 38.214, "3rd Generation Partnership Project, Technical Specification Group Radio Access Network, NR, Physical Layer Procedures for Data (Release 15)", 3GPP TS 38.214, V15.9.0, Mar. 31, 2020 (Mar. 31, 2020), 105 Pages, sections 5-6, sections 5.1.7, 5.1.7.1 and 5.1.7.2.

* cited by examiner

METHODS AND APPARATUS TO FACILITATE A HARQ FLUSH INDICATOR FOR TRANSMISSIONS

CROSS REFERENCE TO RELATED APPLICATION(S)

This application claims the benefit of U.S. Provisional Patent Application Ser. No. 63/012,027, entitled "Methods and Apparatus to Facilitate A HARQ Flush Indicator for Downlink Transmissions," and filed on Apr. 17, 2020, which is expressly incorporated by reference herein in its entirety.

INTRODUCTION

The present disclosure relates generally to communication systems, and more particularly, to communication systems utilizing code blocks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a transmitter. The method includes transmitting a first transmission of one or more code blocks (CBs). The method also includes receiving negative feedback for at least one CB of the first transmission. Additionally, the method includes retransmitting the at least one CB. The method further includes transmitting a flush indicator (FI) indicating to not combine a retransmission of the at least one CB with a prior transmission of the at least one CB.

In another aspect of the disclosure, an apparatus for wireless communication at a transmitter is provided. The apparatus includes means for transmitting a first transmission of one or more CBs. The apparatus also includes means for receiving negative feedback for at least one CB of the first transmission. Additionally, the apparatus includes means for retransmitting the at least one CB. The apparatus further includes means for transmitting an FI indicating to not combine a retransmission of the at least one CB with a prior transmission of the at least one CB.

In another aspect of the disclosure, an apparatus for wireless communication at a transmitter is provided. The apparatus includes memory and at least one processor coupled to the memory. The memory and the at least one processor are configured to transmit a first transmission of one or more CBs. The memory and the at least one processor may also be configured to receive negative feedback for at least one CB of the first transmission. Additionally, the memory and the at least one processor may be configured to retransmit the at least one CB. The memory and the at least one processor may further be configured to transmit an FI indicating to not combine a retransmission of the at least one CB with a prior transmission of the at least one CB.

In another aspect of the disclosure, a computer-readable medium storing computer executable code for wireless communication at a transmitter is provided. The code, when executed, causes a processor to transmit a first transmission of one or more CBs. The code, when executed, may also cause the processor to receive negative feedback for at least one CB of the first transmission. Additionally, the code, when executed, may cause the processor to retransmit the at least one CB. The code, when executed, may further cause the processor to transmit an FI indicating to not combine a retransmission of the at least one CB with a prior transmission of the at least one CB.

In another aspect of the disclosure, a method is provided for wireless communication at a receiver. The method includes receiving a first transmission of one or more CBs. The method also includes transmitting negative feedback for at least one CB of the first transmission. Additionally, the method includes receiving a retransmission of the at least one CB. The method further includes receiving an FI indicating to not combine a retransmission of the at least one CB with a prior transmission of the at least one CB.

In another aspect of the disclosure, an apparatus for wireless communication at a receiver is provided. The apparatus includes means for receiving a first transmission of one or more CBs. The apparatus also includes means for transmitting negative feedback for at least one CB of the first transmission. Additionally, the apparatus includes means for receiving a retransmission of the at least one CB. The apparatus further includes means for receiving an FI indicating to not combine a retransmission of the at least one CB with a prior transmission of the at least one CB.

In another aspect of the disclosure, an apparatus for wireless communication at a receiver is provided. The apparatus includes memory and at least one processor coupled to the memory. The memory and the at least one processor are configured to receive a first transmission of one or more CBs. The memory and the at least one processor may also be configured to transmit negative feedback for at least one CB of the first transmission. Additionally, the memory and the at least one processor may be configured to receive a retransmission of the at least one CB. The memory and the at least one processor may further be configured to receive an FI indicating to not combine a retransmission of the at least one CB with a prior transmission of the at least one CB.

In another aspect of the disclosure, a computer-readable medium storing computer executable code for wireless communication at a receiver is provided. The code, when executed, causes a processor to receive a first transmission of one or more CBs. The code, when executed, may also cause the processor to transmit negative feedback for at least one CB of the first transmission. Additionally, the code, when executed, may cause the processor to receive a retransmission of the at least one CB. The code, when executed, may further cause the processor to receive an FI indicating to not combine a retransmission of the at least one CB with a prior transmission of the at least one CB.

In an aspect of the disclosure, a method is provided for wireless communication at a transmitter. The method includes transmitting a sidelink transmission of one or more CBs using code block groups, each code block group including one or more CBs of the sidelink transmission. The method also includes receiving negative feedback for at least one CB of the sidelink transmission. Additionally, the method includes retransmitting the at least one CB. The method further includes transmitting an FI indicating to avoid combining a prior sidelink transmission of the at least one CB with a retransmission of the at least one CB.

In another aspect of the disclosure, an apparatus for wireless communication at a transmitter is provided. The apparatus includes means for transmitting a sidelink transmission of one or more CBs using code block groups, each code block group including one or more CBs of the sidelink transmission. The apparatus also includes means for receiving negative feedback for at least one CB of the sidelink transmission. Additionally, the apparatus includes means for retransmitting the at least one CB. The apparatus further includes means for transmitting an FI indicating to avoid combining a prior sidelink transmission of the at least one CB with a retransmission of the at least one CB.

In another aspect of the disclosure, an apparatus for wireless communication at a transmitter is provided. The apparatus includes memory and at least one processor coupled to the memory. The memory and the at least one processor are configured to transmit a sidelink transmission of one or more CBs using code block groups, each code block group including one or more CBs of the sidelink transmission. The memory and the at least one processor may also be configured to receive negative feedback for at least one CB of the sidelink transmission. Additionally, the memory and the at least one processor may be configured to retransmit the at least one CB. The memory and the at least one processor may further be configured to transmit an FI indicating to avoid combining a prior sidelink transmission of the at least one CB with a retransmission of the at least one CB.

In another aspect of the disclosure, a computer-readable medium storing computer executable code for wireless communication at a transmitter is provided. The code, when executed, causes a processor to transmit a sidelink transmission of one or more CBs using code block groups, each code block group including one or more CBs of the sidelink transmission. The code, when executed, may also cause the processor to receive negative feedback for at least one CB of the sidelink transmission. Additionally, the code, when executed, may cause the processor to retransmit the at least one CB. The code, when executed, may further cause the processor to transmit an FI indicating to avoid combining a prior sidelink transmission of the at least one CB with a retransmission of the at least one CB.

In another aspect of the disclosure, a method is provided for wireless communication at a receiver. The method includes receiving, from a first sidelink device and at a second sidelink device, a sidelink transmission of one or more CBs using code block groups, each code block group including one or more CBs of the sidelink transmission. The method also includes transmitting negative feedback for at least one CB of the sidelink transmission. Additionally, the method includes receiving a retransmission of the at least one CB. The method further includes receiving an FI indicating to avoid combining a prior transmission of the at least one CB with a retransmission of the at least one CB.

In another aspect of the disclosure, an apparatus for wireless communication at a receiver is provided. The apparatus includes means for receiving, from a first sidelink device and at a second sidelink device, a sidelink transmission of one or more CBs using code block groups, each code block group including one or more CBs of the sidelink transmission. The apparatus also includes means for transmitting negative feedback for at least one CB of the sidelink transmission. Additionally, the apparatus includes means for receiving a retransmission of the at least one CB. The apparatus further includes means for receiving an FI indicating to avoid combining a prior transmission of the at least one CB with a retransmission of the at least one CB.

In another aspect of the disclosure, an apparatus for wireless communication at a receiver is provided. The apparatus includes memory and at least one processor coupled to the memory. The memory and the at least one processor are configured to receive, from a first sidelink device and at a second sidelink device, a sidelink transmission of one or more CBs using code block groups, each code block group including one or more CBs of the sidelink transmission. The memory and the at least one processor may also be configured to transmit negative feedback for at least one CB of the sidelink transmission. Additionally, the memory and the at least one processor may be configured to receive a retransmission of the at least one CB. The memory and the at least one processor may further be configured to receive an FI indicating to avoid combining a prior transmission of the at least one CB with a retransmission of the at least one CB.

In another aspect of the disclosure, a computer-readable medium storing computer executable code for wireless communication at a receiver is provided. The code, when executed, causes a processor to receive, from a first sidelink device and at a second sidelink device, a sidelink transmission of one or more CBs using code block groups, each code block group including one or more CBs of the sidelink transmission. The code, when executed, may also cause the processor to transmit negative feedback for at least one CB of the sidelink transmission. Additionally, the code, when executed, may cause the processor to receive a retransmission of the at least one CB. The code, when executed, may further cause the processor to receive an FI indicating to avoid combining a prior transmission of the at least one CB with a retransmission of the at least one CB.

In an aspect of the disclosure, a method is provided for wireless communication at a transmitter. The method includes transmitting an uplink transmission of one or more CBs using code block groups, each code block group including one or more CBs of the uplink transmission. The method also includes receiving negative feedback for at least one CB of the uplink transmission. Additionally, the method includes retransmitting the at least one CB. The method further includes transmitting an FI indicating to avoid combining a prior uplink transmission of the at least one CB with a retransmission of the at least one CB.

In another aspect of the disclosure, an apparatus for wireless communication at a transmitter is provided. The apparatus includes means for transmitting an uplink transmission of one or more CBs using code block groups, each code block group including one or more CBs of the uplink transmission. The apparatus also includes means for receiving negative feedback for at least one CB of the uplink transmission. Additionally, the apparatus includes means for retransmitting the at least one CB. The apparatus further includes means for transmitting an FI indicating to avoid combining a prior uplink transmission of the at least one CB with a retransmission of the at least one CB.

In another aspect of the disclosure, an apparatus for wireless communication at a transmitter is provided. The apparatus includes memory and at least one processor coupled to the memory. The memory and the at least one processor are configured to transmit an uplink transmission of one or more CBs using code block groups, each code block group including one or more CBs of the uplink transmission. The memory and the at least one processor may also be configured to receive negative feedback for at least one CB of the uplink transmission. Additionally, the memory and the at least one processor may be configured to retransmit the at least one CB. The memory and the at least one processor may further be configured to transmit an FI indicating to avoid combining a prior uplink transmission of the at least one CB with a retransmission of the at least one CB.

In another aspect of the disclosure, a computer-readable medium storing computer executable code for wireless communication at a transmitter is provided. The code, when executed, causes a processor to transmit an uplink transmission of one or more CBs using code block groups, each code block group including one or more CBs of the uplink transmission. The code, when executed, may also cause the processor to receive negative feedback for at least one CB of the uplink transmission. Additionally, the code, when executed, may cause the processor to retransmit the at least one CB. The code, when executed, may further cause the processor to transmit an FI indicating to avoid combining a prior uplink transmission of the at least one CB with a retransmission of the at least one CB.

In another aspect of the disclosure, a method is provided for wireless communication at a receiver. The method includes receiving an uplink transmission of one or more CBs using code block groups, each code block group including one or more CBs of the uplink transmission. The method also includes transmitting negative feedback for at least one CB of the uplink transmission. Additionally, the method includes receiving a retransmission of the at least one CB. The method further includes receiving an FI indicating to avoid combining a prior transmission of the at least one CB with a retransmission of the at least one CB.

In another aspect of the disclosure, an apparatus for wireless communication at a receiver is provided. The apparatus includes means for receiving an uplink transmission of one or more CBs using code block groups, each code block group including one or more CBs of the uplink transmission. The apparatus also includes means for transmitting negative feedback for at least one CB of the uplink transmission. Additionally, the apparatus includes means for receiving a retransmission of the at least one CB. The apparatus further includes means for receiving an FI indicating to avoid combining a prior transmission of the at least one CB with a retransmission of the at least one CB.

In another aspect of the disclosure, an apparatus for wireless communication at a receiver is provided. The apparatus includes memory and at least one processor coupled to the memory. The memory and the at least one processor are configured to receive an uplink transmission of one or more CBs using code block groups, each code block group including one or more CBs of the uplink transmission. The memory and the at least one processor may also be configured to transmit negative feedback for at least one CB of the uplink transmission. Additionally, the memory and the at least one processor may be configured to receive a retransmission of the at least one CB. The memory and the at least one processor may further be configured to receive an FI indicating to avoid combining a prior transmission of the at least one CB with a retransmission of the at least one CB.

In another aspect of the disclosure, a computer-readable medium storing computer executable code for wireless communication at a receiver is provided. The code, when executed, causes a processor to receive an uplink transmission of one or more CBs using code block groups, each code block group including one or more CBs of the uplink transmission. The code, when executed, may also cause the processor to transmit negative feedback for at least one CB of the uplink transmission. Additionally, the code, when executed, may cause the processor to receive a retransmission of the at least one CB. The code, when executed, may further cause the processor to receive an FI indicating to avoid combining a prior transmission of the at least one CB with a retransmission of the at least one CB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
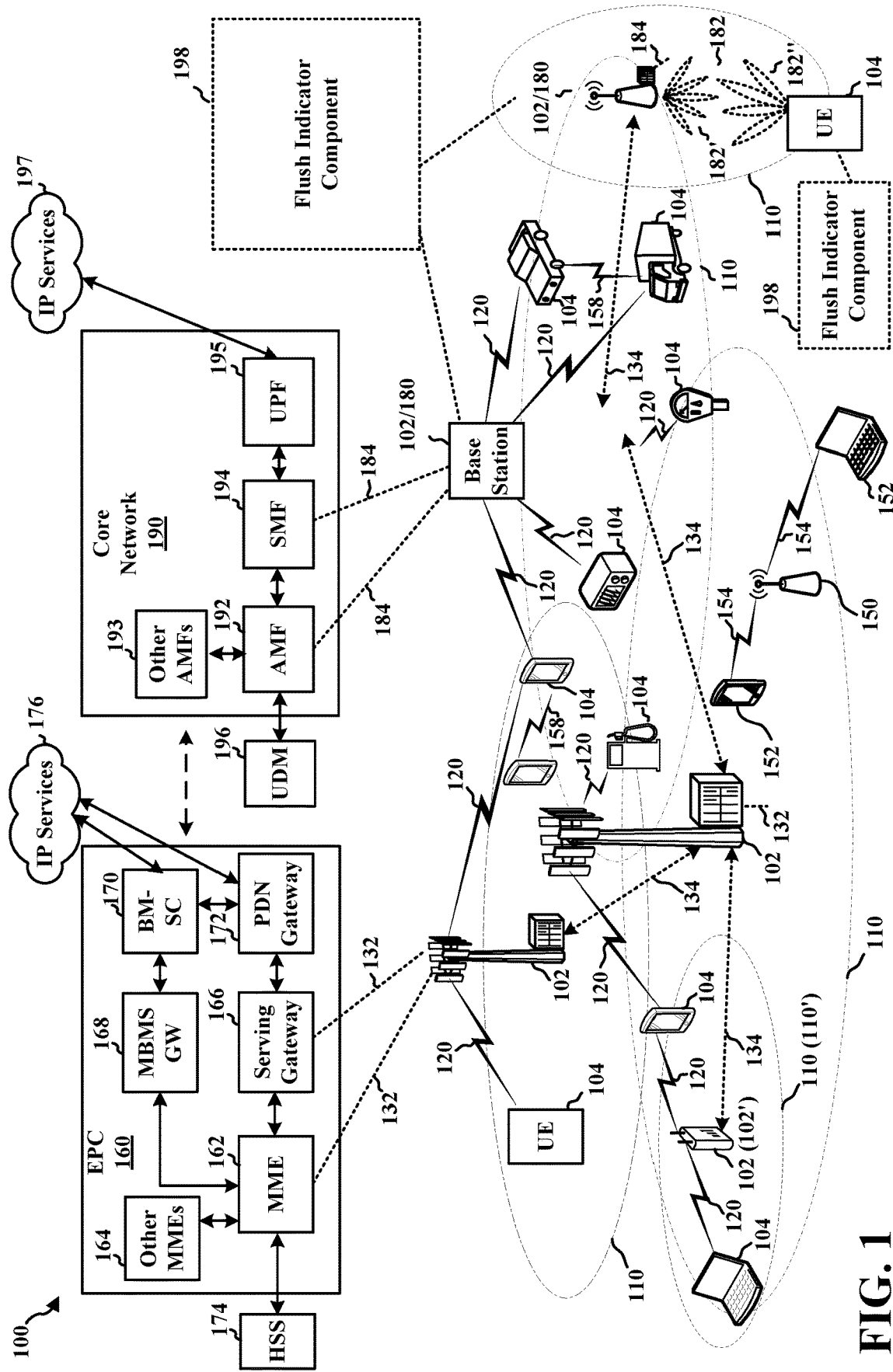
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

A transport block is a packet of data that is passed from the MAC layer to the physical layer of a transmitter. Before being transmitted via an over-an-air interface to a receiver, the physical layer may perform physical layer processing of the transport block. For example, the transmitter may provide error detection capability to the transport block by attaching cyclic redundancy check (CRC) bits to the transport block to form a segment. In some examples, the size of the segment may be larger than a maximum packet size and, thus, the transmitter may determine to perform code block segmentation to generate a plurality of code blocks. The transmitter may then provide error detection capability for the code blocks by attaching respective CRC bits to each of the code blocks to generate a plurality of packets.

The error detection capability may enable a receiver to determine whether a received transmission is successfully received. The receiver may then provide HARQ feedback to indicate to the transmitter when an error is detected in the received transmission (e.g., by transmitting a NACK message to the transmitter) or when no error is detected in the received transmission (e.g., by transmitting an ACK message to the transmitter).

In some examples, when the receiver detects an error in the received transmission, the receiver may buffer the received data and request a re-transmission. The receiver may then combine the buffered data with the re-transmitted data prior to performing channel decoding. Thus, HARQ feedback may facilitate improving the reliability of a data transmission by managing the transmission (and re-transmission) of data from the transmitter to the receiver.

In some examples, the receiver may perform HARQ feedback at a transport block level. For example, the receiver may transmit a single ACK/NACK message that is associated with the transport block. In such examples, if the receiver detects an error in any of the packets, the receiver transmits a single NACK message to the transmitter. In response to receiving the NACK message, the transmitter may re-transmit the entire transport block by re-transmitting each of the packets to the receiver. It may be appreciated that as the size of the transport block increases, the probability of an error being detected by the receiver in any of the packets also increases, which may result in an inefficient use of resources as the transmitter re-transmits large amounts of data (e.g., the entire transport block).

In some examples, the receiver may perform HARQ feedback at a code block level. For example, the receiver may transmit respective ACK/NACK messages for each of the code blocks. In some such examples, if the receiver detects an error in a packet, the receiver transmits a NACK message for the respective packet to the transmitter. In response to receiving the NACK message, the transmitter may re-transmit the respective packet to the receiver. It may be appreciated that, relative to employing HARQ feedback at the transport block level, performing HARQ feedback at the code block level may reduce the amount of data that may be transmitted, but may also increase the amount of signaling between the transmitter and the receiver as the receiver sends a separate ACK/NACK message for each packet instead of a single ACK/NACK message.

To reduce the amount of additional signaling between the transmitter and the receiver, and to refrain from retransmitting the full transport block in cases of a NACK message, some example techniques disclosed herein enable the receiver to perform HARQ feedback at a code block group level. A code block group may include one or more code blocks. A transport block may be segmented into any suitable quantity of code block groups, such as two code block groups, three code block groups, four code block groups, six code block groups, or eight code block groups.

In some examples in which the transport block is segmented into code block groups, the receiver may transmit respective ACK/NACK messages for each code block group. In some such examples, if the receiver detects an error in a packet, the receiver transmits a NACK message for the code block group that includes the respective packet to the transmitter. In response to receiving the NACK message, the transmitter may map the NACK message to the respective code block group and re-transmit the respective packets associated with the mapped code block group to the receiver.

In some examples, a first (or initial) transmission of a transport block may include all of the code block groups of the transport block. For example, a first (or initial) transmission of a transport block may include three code block groups (and their respective code blocks). In some such examples, a retransmission of the transport block may include the one or more code block groups associated with a negative feedback message. In some examples, a code block group transmission information (CBGTI) field may indicate which code block groups are included in a particular transmission. The CBGTI field may have a length based on the quantity of code block groups associated with the transport block. For example, the CBGTI field for the transport block may include three bits where the value of each bit indicates the presence or absence of the respective code block group in a transmission. Thus, it may be appreciated that the CBGTI field may be a bitmap where a first value (e.g., a "1") indicates that the respective code block group is included in the transmission and a second value (e.g., a "0") indicates that the respective code block group is not included in the transmission.

In some examples, a transmission may include a code block group flush indicator (CBGFI) to indicate whether the set of code block groups being retransmitted can be combined with previous transmission(s). For example, a receiver may apply combining between an original transmission of a message and retransmissions of the message to facilitate improving the decoding success rate. Thus, the CBGFI may be a binary value to indicate whether to combine buffered data with retransmit data or to avoid combining (e.g., "flush out") the buffered data. In some such examples, the CBGFI may be linked with the code block groups indicated by the CBGTI field. For example, the CBGTI field may indicate that a particular retransmission includes the first code block group and the third code block group. When the CBGFI is set to a first value (e.g., a "1"), the receiver receiving the transmission may determine to "flush out" or clear the buffered data associated with the first code block group and the third code block group. When the CBGFI is set to a second value (e.g., a "0"), the receiver receiving the transmission may combine the code blocks associated with the first code block group and the third code block group with the buffered code blocks associated with the respective packets.

Example techniques disclosed herein provide a flush indicator that is robust and provides granular indications on whether to combine or avoid combining (e.g., not to combine) data from prior transmissions. For example, disclosed techniques enable a transmitting device to transmit a transmission including a flush indicator. The flush indicator may be configured to indicate whether data from a prior transmission is corrupt, regardless of whether the transmission includes code block groups. That is, in some examples, the transmitting device may decouple the transmission of the CBGTI with the flush indicator so that the flush indicator may be transmitted independent of whether a CBGTI is transmitted.

Furthermore, disclosed techniques enable implementing the flush indicator via an N-bit field so that each bit of the flush indicator field corresponds to a respective code block group. By employing an N-bit field for the flush indicator, the flush indicator may control the flushing or combining of respective code block groups at a code block group level, rather than the code block groups indicated by the CBGTI. For example, referring to the example in which the CBGTI indicates that a particular retransmission includes the first code block group and the third code block group, disclosed techniques enable the flush indicator to be an N-bit field so that each bit corresponds to a different one of the code block groups of the transport block. In some such examples, a first value of a bit of the flush indicator may indicate whether to combine or to avoid combining the code blocks associated with the first code block group and a different value of a bit of the flush indicator may indicate whether to combine or to avoid combining the code blocks associated with the third code block group.

Thus, it may be appreciated that aspects presented herein may improve communication between a transmitter and a receiver by providing a flush indicator in sidelink transmissions and uplink transmissions. The transmitter may be configured to transmit transmissions and to receive feedback at a transport block level, at a code block level, or at a code block group level. The flush indicator may be configured to be a single-bit field or a multi-bit field. In some examples, the flush indicator may be included in a first (or initial) transmission of one or more code blocks.

According to one or more non-limiting examples, disclosed techniques may provide a flush indicator that is robust and provides granular indications on whether to combine or not to combine data from a retransmission with data from prior transmissions. For example, disclosed techniques enable the flush indicator to be implemented via an N-bit field so that each bit of the flush indicator corresponds to a respective set of code blocks (e.g., a code block group). By employing an N-bit field for the flush indicator, the flush indicator may be used to control the combining of or flushing of respective code block groups at a code block group level, rather than the code block groups that may be indicated by additional signaling (e.g., a code block group transmission information (CBGTI) field). In some examples, the flush indicator may be included in first (or initial) transmissions of one or more code blocks and may also be included in retransmissions. In some such examples, the value of the flush indicator may be set to a known value for each first (or initial) transmission of the one or more code blocks. For example, the flush indicator included in a first (or initial) transmission may be set to a value that indicates to flush any buffered data (e.g., to not combine the code blocks of the current transmission with code blocks of a prior transmission).

FIG. 1 is a diagram illustrating an example of a wireless communications system and an access network 100 that includes UEs 104 in communication with base stations 102 or base stations 180. As an example, in FIG. 1, a transmitting device, such as a transmitting UE 104 and/or a base station 102/180, may include a flush indicator component 198. In certain aspects, the example flush indicator component 198 may be configured to transmit a first transmission of one or more CBs. The example flush indicator component 198 may also be configured to receive negative feedback for at least one CB of the first transmission. Additionally, the example flush indicator component 198 may be configured to retransmit the at least one CB. The flush indicator component 198 may also be configured to transmit an FI indicating to not combine a retransmission of the at least one CB with a prior transmission of the at least one CB.

In another configuration, the transmitting device may include the example flush indicator component 198 configured to transmit a sidelink transmission of one or more CBs using code block groups, each code block group including one or more CBs of the sidelink transmission. The example flush indicator component 198 may also be configured to receive negative feedback for at least one CB of the sidelink transmission. Additionally, the example flush indicator component 198 may be configured to retransmit the at least one CB. The example flush indicator component 198 may also be configured to transmit an FI indicating to avoid combining a prior sidelink transmission of the at least one CB with a retransmission of the at least one CB.

In another configuration, the transmitting device may include the example flush indicator component 198 configured to transmit an uplink transmission of one or more CBs using code block groups, each code block group including one or more CBs of the uplink transmission. The example flush indicator component 198 may also be configured to receive negative feedback for at least one CB of the uplink transmission. Additionally, the example flush indicator component 198 may be configured to retransmit the at least one CB. The example flush indicator component 198 may also be configured to transmit an FI indicating to avoid combining a prior uplink transmission of the at least one CB with a retransmission of the at least one CB.

Still referring to FIG. 1, in certain aspects, a receiving device, such as the UE 104 and/or a sidelink UE 104, may include the example flush indicator component 198 configured to receive a first transmission of one or more CBs. Additionally, the example flush indicator component 198 may be configured to transmit negative feedback for at least one CB of the first transmission. The example flush indicator component 198 may also be configured to receive a retransmission of the at least one CB. Further, the example flush indicator component 198 may be configured to receive an FI indicating to not combine a retransmission of the at least one CB with a prior transmission of the at least one CB.

In another configuration, the receiving device may include the flush indicator 198 configured to receive, from a first sidelink device and at a second sidelink device, a sidelink transmission of one or more CBs using code block groups, each code block group including one or more CBs of the sidelink transmission. The example flush indicator component 198 may also be configured to transmit negative feedback for at least one CB of the sidelink transmission. Additionally, the example flush indicator component 198 may be configured to receive a retransmission of the at least one CB. The example flush indicator component 198 may also be configured to receive an FI indicating to avoid combining a prior transmission of the at least one CB with a retransmission of the at least one CB.

In another configuration, the receiving device may include the flush indicator 198 configured to receive an uplink transmission of one or more CBs using code block groups, each code block group including one or more CBs of the uplink transmission. The example flush indicator component 198 may also be configured to transmit negative feedback for at least one CB of the uplink transmission. Additionally, the example flush indicator component 198 may be configured to receive a retransmission of the at least one CB. The example flush indicator component 198 may also be configured to receive an FI indicating to avoid combining a prior transmission of the at least one CB with a retransmission of the at least one CB.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

It may be understood that the above examples are not necessarily intended to limit claimed subject matter. For example, unless specifically recited, claimed subject matter relating to wireless communications is not necessarily intended to be limited to any particular author/entity defined frequency band, or the like.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
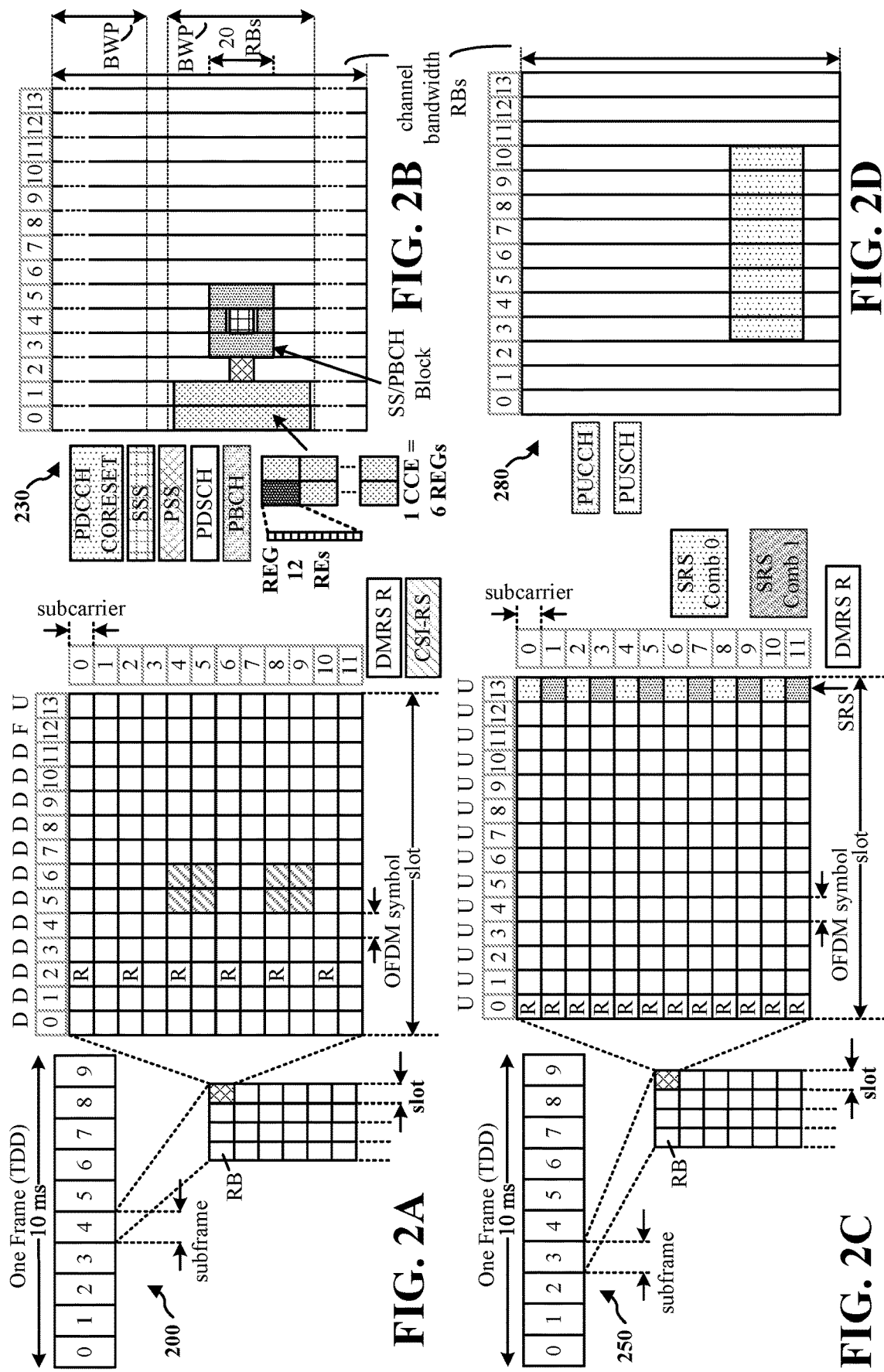
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
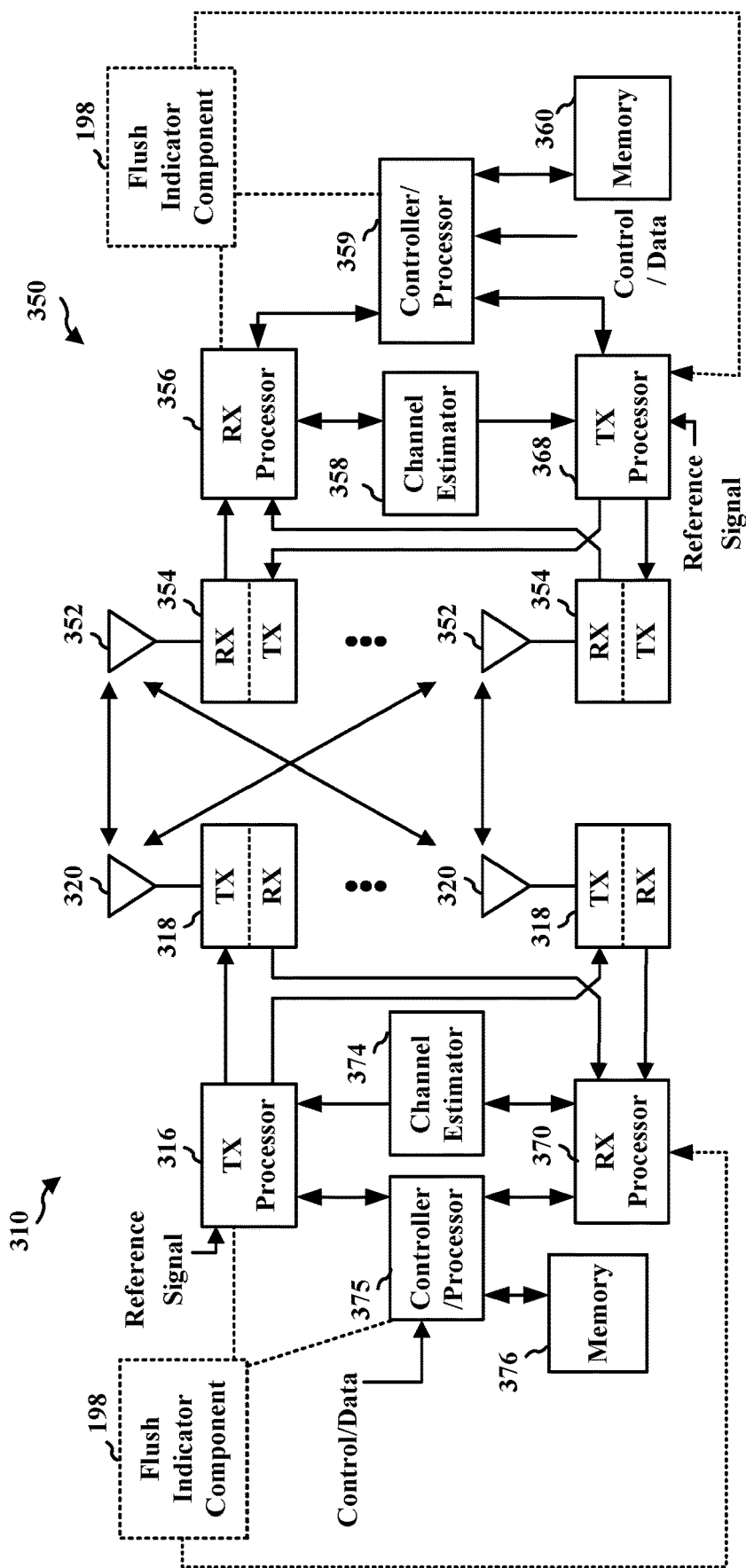
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316 or the TX processor 368, the RX processor 370 or the RX processor 356, and the controller/processor 375 or the controller/processor 359 may be configured to perform aspects in connection with the flush indicator component 198 of FIG. 1.

A transport block is a packet of data that is passed from the MAC layer to the physical layer of a transmitter. Before being transmitted via an over-an-air interface to a receiver, the physical layer may perform physical layer processing of the transport block. For example, the physical layer of the transmitter may provide error detection capabilities, perform code block segmentation of a large transport block to ensure that a size of each code block does not exceed a maximum packet size, etc.

Figure 4:
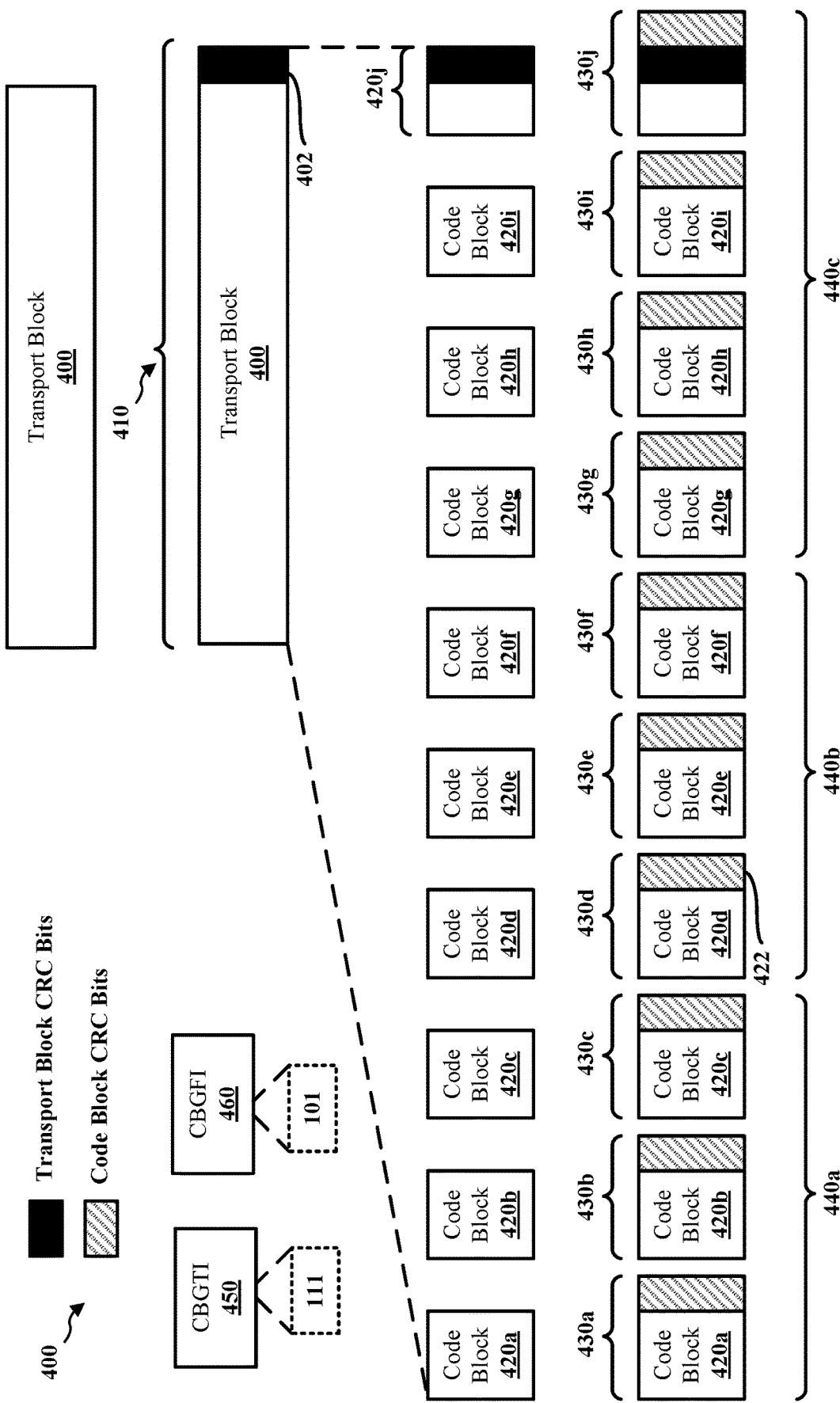
FIG. 4 is a diagram illustrating an example transport block segmented into code blocks and code block groups, in accordance with one or more techniques disclosed herein.

FIG. 4 depicts an example of code block segmentation of an example transport block 400, in accordance with one or more techniques disclosed herein. In the illustrated example, the transport block 400 may be passed from the MAC layer of a transmitter to the physical layer of the transmitter to perform physical layer processing. The transmitter may provide error detection capability to the transport block 400 by attaching cyclic redundancy check (CRC) bits 402 to the transport block 400 to form a segment 410. In the example of FIG. 4, the size of the segment 410 is larger than a maximum packet size and, thus, the transmitter may determine to perform code block segmentation to generate a plurality of code blocks. In the illustrated example of FIG. 4, the transmitter generates ten example code blocks 420a-420j that each have a size that is less than a maximum packet size, such as 3840 bits or 8448 bits. The transmitter may then provide error detection capability for the code blocks 420a-420j by attaching respective CRC bits 422 to each of the code blocks 420a-420j to generate a plurality of packets 430a-430j. In the illustrated example, the size of each of the packets 430a-430j is less than the maximum packet size.

The error detection capability (e.g., the CRC bits 402 and the CRC bits 422) may enable a receiver to determine whether a received transmission (e.g., the packets 430a-430j) is successfully received. The receiver may then provide HARQ feedback to indicate to the transmitter when an error is detected in the received transmission (e.g., by transmitting a NACK message to the transmitter) or when no error is detected in the received transmission (e.g., by transmitting an ACK message to the transmitter).

In some examples, when the receiver detects an error in the received transmission, the receiver may buffer the received data and request a re-transmission. The receiver may then combine the buffered data with the re-transmitted data prior to performing channel decoding. Thus, HARQ feedback may facilitate improving the reliability of a data transmission by managing the transmission (and re-transmission) of data from the transmitter to the receiver.

In some examples, the receiver may perform HARQ feedback at a transport block level. For example, the receiver may transmit a single ACK/NACK message that is associated with the transport block. In such examples, if the receiver detects an error in any of the packets 430a-430j, the receiver transmits a single NACK message to the transmitter. In response to receiving the NACK message, the transmitter may re-transmit the entire transport block 400 by re-transmitting each of the packets 430a-430j to the receiver. It may be appreciated that as the size of the transport block 400 increases, the probability of an error being detected by the receiver in any of the packets 430a-430j also increases, which may result in an inefficient use of resources as the transmitter re-transmits large amounts of data (e.g., the entire transport block 400).

In some examples, the receiver may perform HARQ feedback at a code block level. For example, the receiver may transmit respective ACK/NACK messages for each of the code blocks. In some such examples, if the receiver detects an error in a packet (e.g., the packet 430a), the receiver transmits a NACK message for the respective packet (e.g., the packet 430a) to the transmitter. In response to receiving the NACK message, the transmitter may re-transmit the respective packet (e.g., the packet 430a) to the receiver. It may be appreciated that, relative to employing HARQ feedback at the transport block level, performing HARQ feedback at the code block level may reduce the amount of data that may be transmitted, but may also increase the amount of signaling between the transmitter and the receiver as the receiver sends a separate ACK/NACK message for each packet (e.g., for each of the packets 430a-430j) instead of a single ACK/NACK message.

To reduce the amount of additional signaling between the transmitter and the receiver, and to refrain from retransmitting the full transport block in cases of a NACK message, some example techniques disclosed herein enable the receiver to perform HARQ feedback at a code block group level. A code block group may include one or more code blocks. For example, in the illustrated example of FIG. 4, the example code blocks 420a-420j are segmented into three example code block groups (e.g., a first code block group 440a including the code blocks 420a to 420c, a second code block group 440b including the code blocks 420d to 420f), and a third code block group 440c including the code blocks 420g to 420j). Although the example of FIG. 4 illustrates three example code block groups, it may be appreciated that in additional or alternative examples, the transport block 400 (and/or the segment 410) may be segmented into any suitable quantity of code block groups, such as two code block groups, four code block groups, six code block groups, or eight code block groups.

In some examples in which the transport block is segmented into code block groups, the receiver may transmit respective ACK/NACK messages for each code block group. In some such examples, if the receiver detects an error in a packet (e.g., the packet 430a), the receiver transmits a NACK message for the code block group that includes the respective packet (e.g., the first code block group 440a) to the transmitter. In response to receiving the NACK message, the transmitter may map the NACK message to the respective code block group and re-transmit the respective packets associated with the mapped code block group (e.g., the packets 430a to 430c) to the receiver.

In some examples, a first (or initial) transmission of a transport block may include all of the code block groups of the transport block. For example, a first (or initial) transmission of the transport block 400 of FIG. 4 may include the three code block groups 440a, 440b, 440c (and their respective code blocks 420a-420j and corresponding packets 430a-430j). In some such examples, a retransmission of the transport block may include the one or more code block groups associated with a negative feedback message. In some examples, a code block group transmission information (CBGTI) field 450 may indicate which code block groups are included in a particular transmission. The CBGTI field 450 may have a length based on the quantity of code block groups associated with the transport block. For example, the CBGTI field 450 for the transport block 400 of FIG. 4 may include three bits where the value of each bit indicates the presence or absence of the respective code block group in a transmission. Thus, it may be appreciated that the CBGTI field may be a bitmap where a first value (e.g., a "1") indicates that the respective code block group is included in the transmission and a second value (e.g., a "0") indicates that the respective code block group is not included in the transmission. As shown in FIG. 4, the CBGTI field 450 includes three bits "111" indicating that the code blocks groups 440a, 440b, 440c are included in a transmission.

In some examples, a transmission may include a code block group flush indicator (CBGFI) 460 to indicate whether the set of code block groups being retransmitted can be combined with previous transmission(s). For example, a receiver may apply combining between an original transmission of a message and retransmissions of the message to facilitate improving the decoding success rate. Thus, the CBGFI 460 may be a binary value to indicate whether to combine buffered data with retransmit data or to avoid combining (e.g., "flush out") the buffered data. In some such examples, the CBGFI 460 may be linked with the code block groups indicated by the CBGTI field 450. For example, the CBGTI field 450 may indicate that a particular retransmission includes the first code block group 440a and the third code block group 440c of FIG. 4. When the CBGFI 460 is set to a first value (e.g., a "1"), the receiver receiving the transmission may determine to "flush out" or clear the buffered data associated with the first code block group 440a (e.g., the code blocks 420a to 420c) and the third code block group 440c (e.g., the code blocks 420g to 420j). When the CBGFI 460 is set to a second value (e.g., a "0"), the receiver receiving the transmission may combine the code blocks associated with the first code block group 440a and the third code block group 440c with the buffered code blocks associated with the respective packets. As shown in FIG. 4, the CBGFI 460 includes three bits "101" indicating that the receiver is to flush out the buffered data associated with the first code block group 440*a* and the third code block group 440*c* and to combine the code blocks associated with the second code block group 440*b* with the buffered code blocks associated with the respective packets.

Example techniques disclosed herein provide a flush indicator that is robust and provides granular indications on whether to combine or avoid combining (e.g., not to combine) data from prior transmissions. For example, disclosed techniques enable a transmitting device to transmit a transmission including a flush indicator. The flush indicator may be configured to indicate whether data from a prior transmission is corrupt, regardless of whether the transmission includes code block groups. That is, in some examples, the transmitting device may decouple the transmission of the CBGTI with the flush indicator so that the flush indicator may be transmitted independent of whether a CBGTI is transmitted.

Furthermore, disclosed techniques enable implementing the flush indicator via an N-bit field so that each bit of the flush indicator field corresponds to a respective code block group. As shown in FIG. 4, the CBGFI 460 includes three bits so that the first bit corresponds to the first code block group 440*a*, the second bit corresponds to the second code block group 440*b*, and the third bit corresponds to the third code block group 440*c*. By employing an N-bit field for the flush indicator, the flush indicator may control the flushing or combining of respective code block groups at a code block group level, rather than the code block groups indicated by the CBGTI. For example, referring to the example in which the CBGTI indicates that a particular retransmission includes the first code block group 440*a* and the third code block group 440*c* (e.g., the CBGTI field 450 set to a value "101"), disclosed techniques enable the flush indicator to be an N-bit field so that each bit corresponds to a different one of the code block groups 440*a*-440*c*. In some such examples, a first value of a bit of the flush indicator may indicate whether to combine or to avoid combining the code blocks associated with the first code block group 440*a* (e.g., the code blocks 420*a* to 420*c*) and a different value of a bit of the flush indicator may indicate whether to combine or to avoid combining the code blocks associated with the third code block group 440*c* (e.g., the code blocks 420*g* to 420*j*).

In some examples, the length of the CBGTI field (e.g., M-bits) may be the same as the length of the flush indicator field (e.g., N-bits). For example, the CBGTI field may be a three-bit field and the flush indicator field may be a three-bit field (e.g., M and N are both three, as shown in the example of FIG. 4). In some examples, the length of the CBGTI field may be different than the length of the flush indicator field. For example, the CBGTI field may be a three-bit field and the flush indicator field may be a two-bit field (e.g., M=3 and N=2). In examples in which the lengths of the CBGTI and the flush indicator are different, one or more code blocks may be associated with different code block groups with respective to the CBGTI and the flush indicator.

In some examples, the transmitter may include the flush indicator in retransmissions to indicate which code block group(s) to combine with prior transmissions or to flush (e.g., discard or clear the buffered data). In some such examples, the length of control information (e.g., downlink control information (DCI) or sidelink control information (SCI)), which may include the flush indicator, may vary based on whether the transmission is an initial transmission (e.g. does not include the flush indicator) or is a retransmission (e.g., includes the flush indicator). Disclosed techniques facilitate transmitting the flush indicator for transmissions including the first (or initial) transmission of a transport block. By including the flush indicator in the first transmission of the transport block, the length of the control information does not vary based on whether the transmission is a first transmission of the transport block or a retransmission of the transport block. In some such examples, the value of the flush indicator may be set to a known value for each first (or initial) transmission of the transport block. For example, the flush indicator may be set to a value that indicates to flush any buffered data (e.g., to avoid combining the code blocks of the current transmission with code blocks of a prior transmission).

Figure 5:
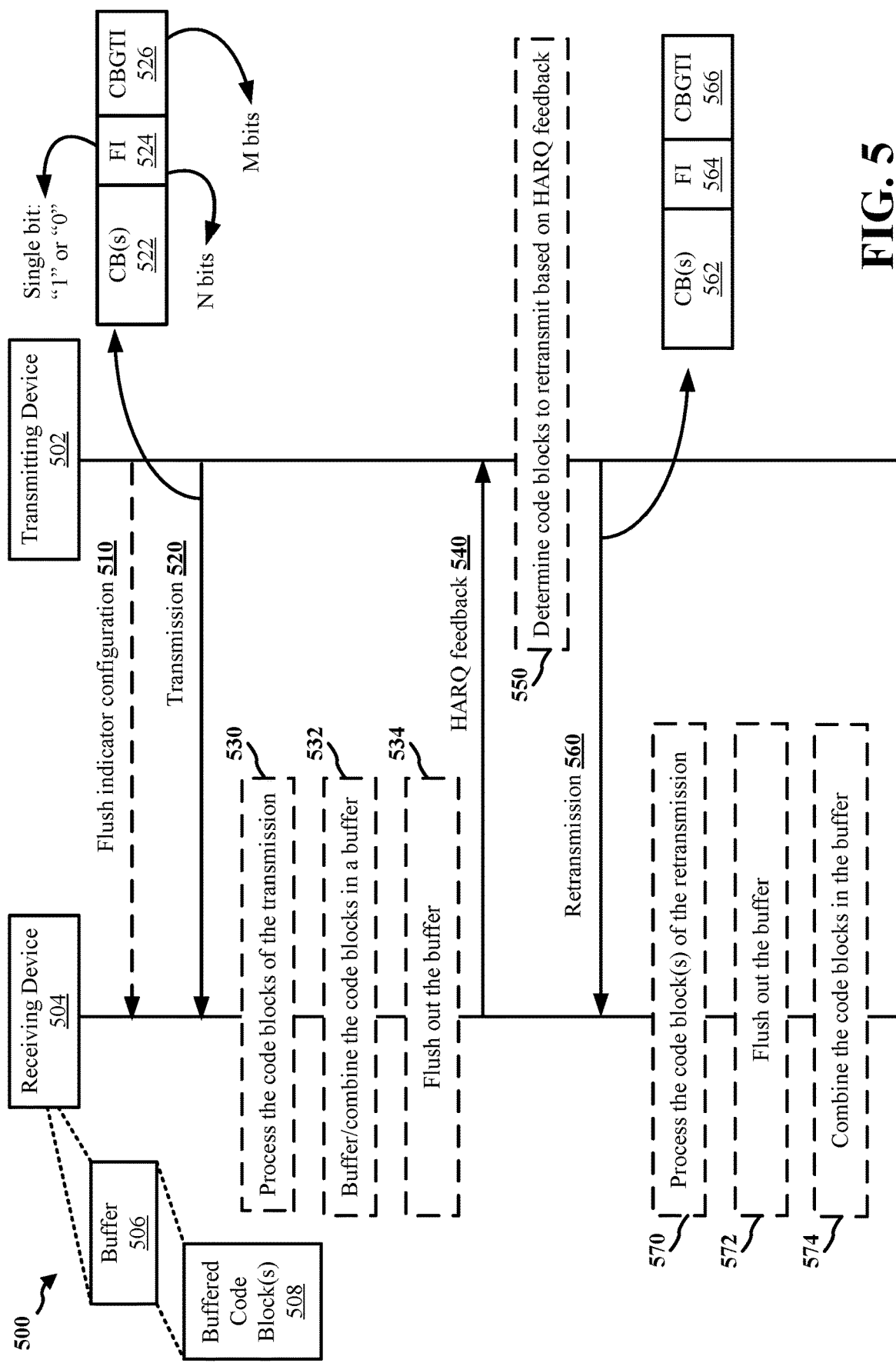
FIG. 5 is an example communication flow between a base station and a UE, in accordance with one or more techniques disclosed herein.

FIG. 5 illustrates an example communication flow 500 between a transmitting device 502 and a receiving device 504, in accordance with one or more techniques disclosed herein. In the illustrated example, the communication flow 500 facilitates a receiving device 504 to combine or to avoid combining buffered data with a retransmission based on an indicator. The transmitting device 502 may transmit the indicator at a transport block level, at a code block level, or at a code block group level.

Aspects of the transmitting device 502 may be implemented by a base station, such as the base station 102/180 and/or the base station 310, or a UE, such as the UE 104 and/or the UE 350. Aspects of the receiving device 504 may be implemented by a base station, such as the base station 102/180 and/or the base station 310, or a UE, such as the UE 104 and/or the UE 350. In the illustrated example of FIG. 5, the transmitting device 502 is in communication with the receiving device 504. Although not shown in the illustrated example of FIG. 5, it may be appreciated that in additional or alternative examples, the transmitting device 502 may be in communication with one or more other base stations or UEs, and/or the receiving device 504 may be in communication with one or more other base stations or UEs.

In some examples, the transmitting device 502 may comprise a base station and the receiving device 504 may comprise a UE. In some examples, the transmitting device 502 may comprise a UE and the receiving device 504 may comprise a base station. In such examples, transmissions from the base station to the UE may be referred to as downlink transmissions and transmissions from the UE to the base station may be referred to as uplink transmissions. Transmissions between the base station and the UE may occur via a Uu interface. In some examples, the transmitting device 502 and the receiving device 504 may comprise sidelink devices. In such examples, transmissions from a first sidelink device to a second sidelink device may be referred to as a sidelink transmission.

In the illustrated example of FIG. 5, the transmitting device 502 may transmit a flush indicator configuration 510 that is received by the receiving device 504. The flush indicator configuration 510 may indicate to the receiving device 504 a length of the flush indicator. For example, the flush indicator configuration 510 may indicate whether the flush indicator is a single-bit field or a multi-bit field.

In some examples in which the flush indicator is configured as a single-bit field, a first value of the flush indicator may indicate to the receiving device 504 to flush (or discard or avoid combining) buffered data associated with prior transmissions, and a second value of the flush indicator may indicate to the receiving device 504 to combine the code blocks of the instant transmission with those of prior transmissions.

In some examples in which the flush indicator is configured as a multi-bit field, each bit of the flush indicator may correspond to a respective code block of a transport block. For example, with respect to the illustrated example of FIG.

4, the flush indicator configuration 510 may indicate that the flush indicator is a ten-bit field, where the first bit of the flush indicator corresponds to the first code block 420a, the second bit of the flush indicator corresponds to the second code block 420b, . . . , and the tenth bit of the flush indicator corresponds to the tenth code block 420j of the transport block 400.

In some examples in which the flush indicator is configured as a multi-bit field, the flush indicator configuration 510 may also include a grouping of code blocks associated with each bit of the multi-field flush indicator. For example, with respect to the illustrated example of FIG. 4, the flush indicator configuration 510 may indicate that the flush indicator is a three-bit field, where the first bit of the flush indicator corresponds to the first code block group 440a (e.g., including the code blocks 420a-420c), the second bit of the flush indicator corresponds to the second code block group 440b (e.g., including the code blocks 420d-420f), and the third bit of the flush indicator corresponds to the third code block group 440c (e.g., including the code blocks 420g-420j).

In some examples, the transmitting device 502 may transmit the flush indicator configuration 510 in at least one of RRC signaling, a medium access control—control element (MAC-CE), SCI, or DCI. In some examples, the length of the flush indicator may be based on an RRC configuration and an indication in a MAC-CE, SCI, or DCI.

The transmitting device 502 transmits a transmission 520 that is received by the receiving device 504. In some examples, the transmission 520 may comprise a downlink transmission from a base station to a UE. In some examples, the transmission 520 may comprise an uplink transmission from a UE to a base station. In other examples, the transmission 520 may comprise a sidelink transmission from a first sidelink device to a second sidelink device.

In the illustrated example of FIG. 5, the transmission 520 includes at least one or more code blocks 522. The transmission 520 may be a first (or initial) transmission of data or may be a retransmission of data. In some examples, the data may include one or more code blocks (e.g., the code blocks 420a-420j of FIG. 4), which may be included in a transport block, such as the transport block 400 of FIG. 4. Aspects of the code blocks 522 may be implemented by the code blocks 420a-420j of FIG. 4.

In some examples, the transmission 520 may also include a flush indicator 524. Aspects of the flush indicator 524 may be implemented by the CBGFI 460 of FIG. 4. In some examples, the flush indicator 524 may be set to a known value for each first (or initial) transmission. For example, if the transmission 520 is an initial transmission of the code blocks 522, the flush indicator 524 may be set to a value (e.g., "1") to indicate to the receiving device 504 to flush out (or clear) the buffered data from prior transmissions. Thus, by setting the flush indicator 524 to a known value (e.g., a "1") for each first (or initial) transmission of a transport block, the receiving device 504 may be configured to avoid combining (or discard) previously received data and to perform combining of data associated with the instant transport block.

In some examples, the transmission 520 may also include a CBGTI field 526. For example, when the transmission 520 includes code block groups, the CBGTI field 526 may facilitate identifying which code block groups are included in the transmission 520. Aspects of the CBGTI field 526 may be implemented by the CBGTI field 450 of FIG. 4. As described above, the length of the CBGTI field 526 may be based on the quantity of code block groups. For example, if the code blocks 522 are segmented into M code block groups, the length of the CBGTI field 526 may be M-bits. In some such examples, each bit of the CBGTI field 526 corresponds to a respective code block group of the M code block groups. For example, referring to the illustrated example of FIG. 4, when the first bit of the CBGTI field 526 is set to a first value (e.g., a "1"), the transmission 520 may include the code blocks associated with the first code block group 440a (e.g., the first three code blocks 420a, 420b, 420c), and when the first bit of the CBGTI field 526 is set to a second value (e.g., a "0"), the transmission 520 may not include the code blocks associated with the first code block group 440a. It may be appreciated that when the transmission 520 is a first (or initial) transmission of the code blocks 522, each bit of the CBGTI field 526 may be set to the first value (e.g., a "1") to indicate that the transmission 520 includes the code blocks associated with each of the code block groups.

In some examples, the length of the CBGTI field 526 may be M-bits and the length of the flush indicator 524 may be N-bits. That is, with respect to the CBGTI field 526, the code blocks 522 may be grouped into M code block groups. Similarly, with respect to the flush indicator 524, the code blocks 522 may be grouped into N code block groups. In some examples, the grouping of code blocks related to the CBGTI field 526 may be the same grouping as the grouping of code blocks related to the flush indicator 524 (e.g., N and M are the same value). For example, the grouping of code blocks related to the CBGTI filed 526 and the grouping of code blocks related to the flush indicator 524 may be the same as the code block groups 440a-440c of FIG. 4. In some examples, the grouping of code blocks related to the CBGTI field 526 may be different than the grouping of code blocks related to the flush indicator 524 (e.g., N and M are different values). For example, the CBGTI field 526 may comprise three bits and the grouping of code blocks related to the CBGTI field 526 may be the same as the code block groups 440a-440c, while the flush indicator 524 may comprise two bits and the grouping of code blocks related to the flush indicator 524 may comprise a first code block group including the code blocks 420a to 430e and a second code block group including the code blocks 420f to 420j.

At 530, the receiving device 504 may process the code blocks 522 of the transmission 520. For example, the receiving device 504 may determine which, if any, of the code blocks 522 include an error. In some examples, the receiving device 504 may also determine how to process any buffered data based on the transmission 520. For example, if the transmission 520 includes the flush indicator 524, the value of the flush indicator 524 may indicate to avoid combining (e.g., to not combine) one or more of the code blocks 522 of the transmission 520 with code blocks of prior transmissions (e.g., to flush the buffered data) or to combine the code blocks 522 of the transmission 520 with code blocks of prior transmissions. It may be appreciated that in some examples, if the transmission 520 is an initial transmission of the code blocks 522, the flush indicator 524 may be set to a known value (e.g., a "1") to cause the receiving device 504 to avoid combining (e.g., to not combine) the code blocks 522 of the transmission 520 with code blocks of prior transmissions (e.g., to flush the buffered data). In some examples in which the transmission 520 is an initial transmission, the receiving device 504 may, at 532, buffer the code blocks 522 in a buffer 506 of the receiving device 504. For example, the receiving device 504 may store the code blocks of the transmission 520 as buffered code blocks 508 in the buffer 506. At 534, the receiving device 504 may flush out (e.g., clear or discard) the buffered code blocks 508 in the buffer 506 based on the flush indicator 524.

After processing the code blocks of the transmission (e.g., at 530), the receiving device 504 transmits HARQ feedback 540 that is received by the transmitting device 502. The HARQ feedback 540 may indicate to the transmitting device 502 when the receiving device 504 is unable to process the received transmission 520 (e.g., by transmitting a NACK message to the transmitting device 502) or when the receiving device successfully processes the received transmission 520 (e.g., by transmitting an ACK message to the transmitting device 502). The receiving device 504 may be unable to process the received transmission 520 due to, for example, an error in reception of the transmission, due to corrupt data, etc.

In some examples, the receiving device 504 may provide the HARQ feedback 540 at a transport block level. For example, the receiving device 504 may transmit the HARQ feedback 540 including a single ACK/NACK message indicating whether the transmission 520 was successfully processed. In some examples, the receiving device 504 may provide the HARQ feedback 540 at a code block level. For example, the receiving device 504 may transmit respective ACK/NACK messages for each code block of the transmission 520. For example, if the receiving device 504 detects an error with the first code block 420a and no errors with the remaining code blocks (e.g., the code blocks 420b to 420j), the HARQ feedback 540 may include negative feedback (e.g., a NACK message) at a location associated with the first code block 420a and may include positive feedback (e.g., an ACK message) at locations associated with the remaining code blocks 420b to 420j. In some examples, the receiving device 504 may provide the HARQ feedback 540 at a code block group level. For example, the receiving device 504 may provide respective ACK/NACK messages for each code block group of the transmission 520. For example, if the receiving device 504 detects an error with the first code block 420a and no errors with the remaining code blocks (e.g., the code blocks 420b to 420j), the HARQ feedback 540 may include negative feedback (e.g., a NACK message) at a location associated with the first code block group 440a and may include positive feedback (e.g., an ACK message) at locations associated with the remaining code block groups 440b, 440c.

At 550, the transmitting device 502 may determine which code blocks (if any) to retransmit to the receiving device 504 based on the received HARQ feedback 540. For example, if the HARQ feedback 540 is at the transport block level, the transmitting device 502 may determine to retransmit the code blocks 522 corresponding to the entire transport block if the HARQ feedback 540 is a NACK message. If the HARQ feedback 540 is at the code block level, the transmitting device 502 may determine to retransmit the code blocks linked with NACK messages. For example, in the above example in which the receiving device 504 transmits the HARQ feedback 540 including a NACK message at a location associated with the first code block 420a and an ACK message at locations associated with the remaining code blocks 420b to 420j, the transmitting device 502 may determine to retransmit the first code block 420a and to refrain from retransmitting the code blocks 420b to 420j. If the HARQ feedback 540 is at the code block group level, the transmitting device 502 may determine to retransmit the code block group(s) (and the corresponding code blocks) linked with NACK messages. For example, in the above example in which the receiving device 504 transmits the HARQ feedback 540 including a NACK message at a location associated with the first code block group 440a and an ACK message at locations with the remaining code block groups 440b, 440c, the transmitting device 502 may determine to retransmit the code blocks associated with the first code block group 440a (e.g., the code blocks 420a, 420b, 420c).

The transmitting device 502 transmits a retransmission 560 that is received by the receiving device 504. The retransmission 560 includes at least one or more code block(s) 562 that the transmitting device 502 determines to retransmit (e.g., at 550). For example, the retransmission 560 may include all of the code blocks 522 included in the transport block (e.g., when the HARQ feedback 540 is at the transport block level), may include the one or more code blocks 522 linked with a NACK message (e.g., when the HARQ feedback 540 is at the code block level), or may include the code block(s) associated with the one or more code block groups linked with a NACK message (e.g., when the HARQ feedback 540 is at the code block group level).

In the illustrated example of FIG. 5, the retransmission 560 also includes a flush indicator 564. Aspects of the flush indicator 564 may be implemented by the CBGFI 460 of FIG. 4. The flush indicator 564 is configured to indicate to the receiving device 504 how to process the code blocks 562 received in the retransmission 560. As described above, the flush indicator 564 may be set to a first value (e.g., a "1") to cause the receiving device 504 to flush out buffered code blocks or may be set to a second value (e.g., a "0") to cause the receiving device 504 to combine the received code blocks 562 with buffered code blocks received from prior transmissions, such as the transmission 520 of FIG. 5.

In some examples, the flush indicator 564 may be a single-bit field. In some such examples, the flush indicator 564 may be set to the first value (e.g., a "1") to cause the receiving device 504 to flush out (e.g., discard or avoid combining) all buffered code blocks or may be set to the second value (e.g., a "0") to cause the receiving device 504 to combine the code blocks 562 with the buffered code blocks received from prior transmissions.

In some examples, the flush indicator 564 may be a multi-bit field. In some such examples, each bit of the flush indicator 564 may correspond to a respective code block of the code blocks 562. For example, a first bit of the flush indicator 564 may correspond to a first code block (e.g., the first code block 420a). In some such examples, the first bit of the flush indicator 564 may be set to the first value (e.g., a "1") to cause the receiving device 504 to flush out (e.g., discard or avoid combining) the buffered code block corresponding to the first code block or may be set to the second value (e.g., a "0") to cause the receiving device 504 to combine the code block of the code blocks 562 corresponding to the first code block with the buffered code blocks also corresponding to the first code block.

In some example in which the flush indicator 564 is a multi-bit field, each bit of the flush indicator 564 may correspond to a respective code block group of the code blocks 562. For example, a first bit of the flush indicator 564 may correspond to a first code block group (e.g. the first code block group 440a). In some such examples, the first bit of the flush indicator 564 may be set to the first value (e.g., a "1") to cause the receiving device 504 to flush out (e.g., discard or avoid combining) the buffered code blocks corresponding to the first code block group or may be set to the second value (e.g., a "0") to cause the receiving device 504 to combine the code blocks of the code blocks 562 corresponding to the first code block group with the buffered code blocks also corresponding to the first code block group. For example, referring to the illustrated example of FIG. 4, when the first bit of the flush indicator 564 is set to the first value (e.g., a "1"), the receiving device 504 may flush out the buffered code blocks corresponding to the first code block group 440a (e.g., the code blocks 420a, 420b, 420c), and when the first bit of the flush indicator 564 is set to the second value (e.g., a "0"), the receiving device 504 may combine the code blocks 562 corresponding to the first code block group with the buffered code blocks corresponding to the respective code blocks 420a, 420b, 420c.

In some examples, the retransmission 560 may also include a CBGTI field 566. For example, when the retransmission 560 includes code block groups, the CBGTI field 566 may facilitate identifying which code block groups are included in the retransmission 560. Aspects of the CBGTI field 566 may similar to the CBGTI field 526.

At 570, the receiving device 504 may process the code blocks 562 of the retransmission 560. For example, the receiving device 504 may determine which, if any, of the code blocks 562 the receiving device is unable to process. In some examples, the receiving device 504 may also determine how to process any buffered data based on the retransmission 560 and the flush indicator 564. For example, the value of the flush indicator 564 may indicate to the receiving device 504 to avoid combining (e.g., to not combine) the code blocks 562 of the retransmission 560 with code blocks of prior transmissions (e.g., to flush the buffered data of the transmission 520). In such examples, at 572, the receiving device 504 may flush out the buffer 506. For example, the receiving device 504 may discard the buffered code blocks 508 of the buffer 506. In other examples, the value of the flush indicator 564 may indicate to the receiving device 504 to combine the code blocks 562 of the retransmission 560 with code blocks of prior transmissions (e.g., to combine the code blocks 562 with the one or more code blocks 522 of the transmission 520). In such examples, at 574, the receiving device 504 may combine the code blocks 562 with the buffered code blocks 508 of the buffer 506. Although not shown in the illustrated example of FIG. 5, it may be appreciated that the receiving device 504 may transmit another HARQ feedback based on the processing of the code block(s) of the retransmission (e.g., at 570).

Figure 6:
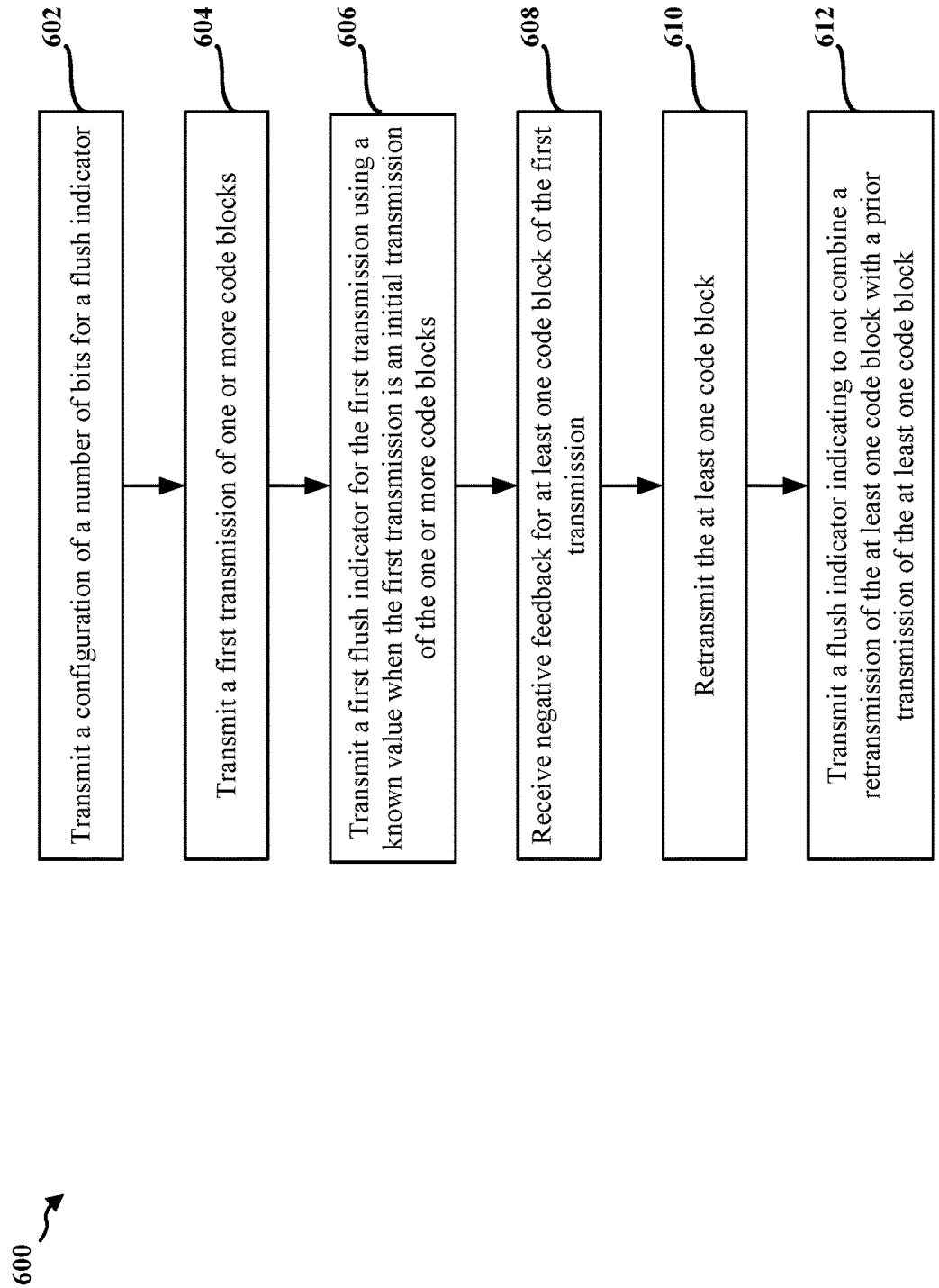
FIG. 6 is a flowchart of a method of wireless communication at a transmitter, in accordance with one or more techniques disclosed herein.

FIG. 6 is a flowchart 600 of a method of wireless communication. The method may be performed by a transmitter (e.g., the transmitting device 502 and/or an apparatus 1602 of FIG. 16). Aspects of the of transmitter may be implemented by a base station (e.g., the base station 102/180 and/or the base station 310) or a UE (e.g., the UE 104 and/or the UE 350). The UE may transmit to a base station, for example, using a Uu interface, or may transmit to another UE, for example, using sidelink. The method may enable a transmitter, such as a base station, to help improve decoding of packets at a receiver, such as a UE.

At 602, the transmitter may transmit a configuration of a number of bits for a flush indicator, as described in connection with the flush indicator configuration 510 of FIG. 5. For example, 602 may be performed by a configuration component 1640 of the apparatus 1602 of FIG. 16. The configuration of the number of bits may indicate that the flush indicator is a single-bit indicator or a multi-bit indicator. In some examples, the configuration of the number of bits may be transmitted in at least one of RRC signaling, a MAC-CE, SCI, or DCI. In some examples, the number of the bits for the flush indicator may be based on an RRC configuration and an indication in a MAC-CE, SCI, or DCI.

At 604, the transmitter transmits a first transmission of one or more code blocks, as described in connection with the example transmission 520 including the code blocks 522 of FIG. 5. For example, 604 may be performed by a first transmission component 1642 of the apparatus 1602 of FIG. 16. In some examples, the one or more code blocks of the first transmission may be comprised in a transport block (TB), such as the example transport block 400 of FIG. 4. In some examples, the first transmission of the code blocks may be performed without generating code block groups.

The first transmission may include the one or more code blocks (e.g., the code blocks 522 of FIG. 5), a flush indicator (e.g., the flush indicator 524 of FIG. 5), and/or a CBGTI (e.g., the CBGTI field 526 of FIG. 5). In some examples, the first transmission of the code blocks is performed using code block groups, such as the example code block groups 440a-440c of FIG. 4. In some such examples, each code block group may correspond to one or more of the at least one code block of the first transmission.

At 606, the transmitter may transmit a first flush indicator for the first transmission using a known value when the first transmission is an initial transmission of the one or more code blocks, as described in connection with the example flush indicator 524 of FIG. 5. For example, 606 may be performed by a flush indicator component 1644 of the apparatus 1602 of FIG. 16. In some examples, the known value is a defined value (e.g., a "1") for first transmissions and indicates to avoid combining (e.g., no combination) for the one or more code blocks of the initial transmission of the one or more code blocks.

In some examples, the flush indicator may include multiple bits (e.g., a multi-bit flush indicator field). In some examples, each bit of the multiple bits of the flush indicator may correspond to a respective code block group of the first transmission.

In some examples, a first value of a flush indicator bit may indicate to avoid combining (e.g., to not combine) a retransmission of code blocks corresponding to the respective code block group, and a second value of the flush indicator bit may indicate to combine the retransmission of code blocks corresponding to the respective code block group. For example, the first value of the flush indicator bit may cause the receiver to refrain from combining (or forego from combining, or skip combining) one or more code blocks.

In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be the same as a second number of the multiple bits of the flush indicator (e.g., the length of the CBGTI field (M-bits) is the same as the length of the flush indicator (N-bits)). In some such examples, a grouping of code blocks related to the CBGTI may be the same as a grouping of code blocks related to the flush indicator.

At 608, the transmitter receives negative feedback for at least one code block of the first transmission, as described in connection with the example HARQ feedback 540 of FIG. 5. For example, 608 may be performed by a feedback component 1646 of the apparatus 1602 of FIG. 16. The negative feedback may include HARQ NACK feedback. The HARQ feedback may be at a transport block level, at a code block level, or at a code block group level.

At 610, the transmitter retransmits the at least one code block, as described in connection with the example retransmission 560 of FIG. 5. For example, 610 may be performed by a retransmission component 1648 of the apparatus 1602 of FIG. 16. The retransmission 560 may include the at least one code block, a flush indicator (e.g., the flush indicator 564), and/or CBGTI (e.g., the CBGTI field 566)

At 612, the transmitter transmits a flush indicator indicating to not combine a retransmission of the at least one code block with a prior transmission of the at least one code block, as described in connection with the example flush indicators 524, 564 of FIG. 5. For example, 612 may be performed by the flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

Figure 7:
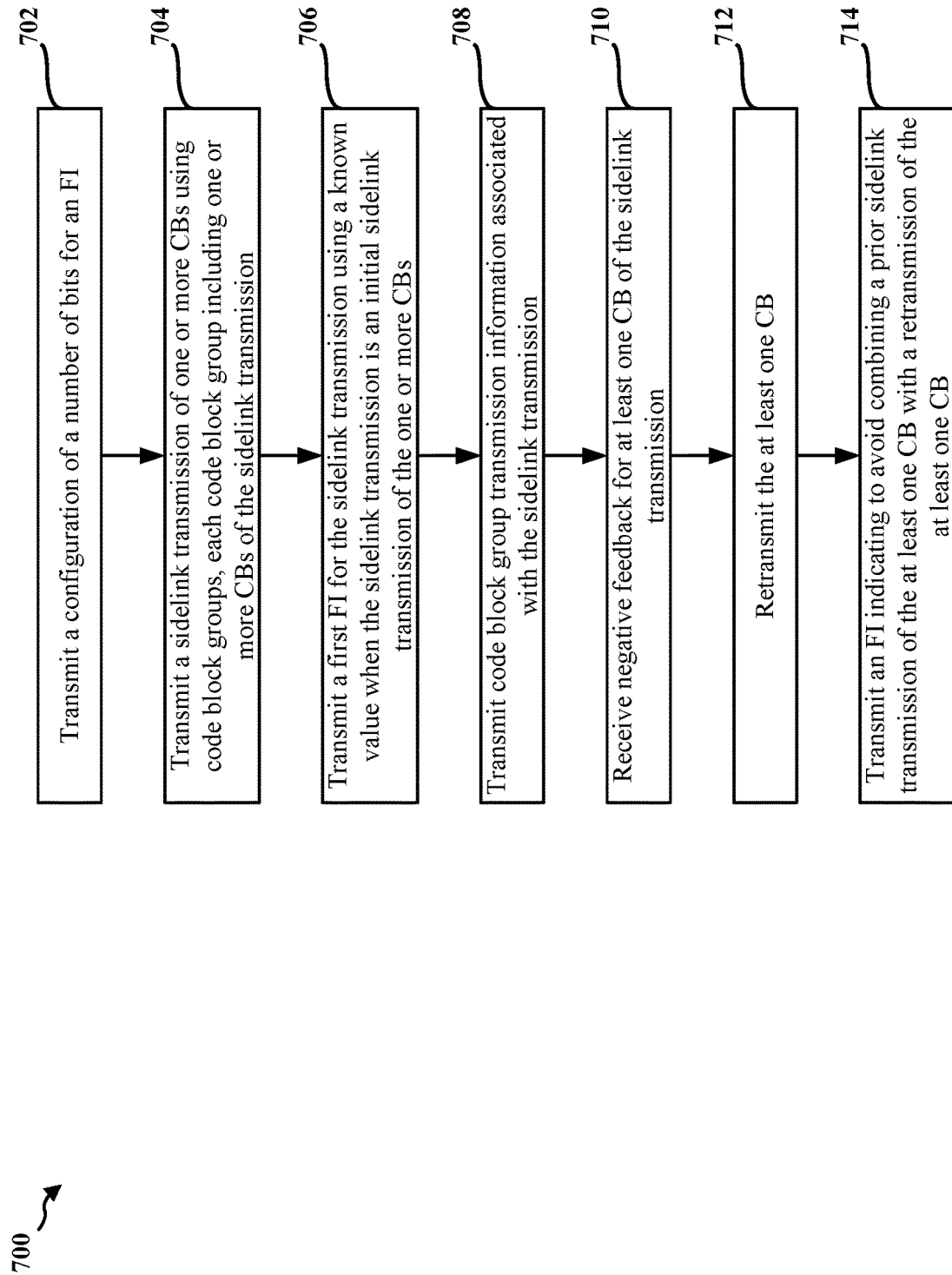
FIG. 7 is a flowchart of a method of wireless communication at a transmitter, in accordance with one or more techniques disclosed herein.

FIG. 7 is a flowchart 700 of a method of wireless communication. The method may be performed by a first sidelink device, such as a transmitting UE (e.g., the UE 104, the UE 350, the transmitting device 502, and/or an apparatus 1602 of FIG. 16). The method may enable a transmitter, such as a first sidelink device, to help improve decoding of packets at a receiver, such as a second sidelink device.

At 704, the first sidelink device transmits a sidelink transmission of one or more CBs using code block groups, each code block group including one or more CBs of the sidelink transmission, as described in connection with the example transmission 520 including the code blocks 522 of FIG. 5. For example, 704 may be performed by a first transmission component 1642 of the apparatus 1602 of FIG. 16. The code block groups may correspond to the example code block groups 440a-440c of FIG. 4. In some examples, the one or more code blocks of the sidelink transmission may be comprised in a transport block, such as the example transport block 400 of FIG. 4. In some examples, the sidelink transmission of the code blocks may be performed without generating code block groups.

At 710, the first sidelink device receives negative feedback for at least one CB of the sidelink transmission, as described in connection with the example HARQ feedback 540 of FIG. 5. For example, 710 may be performed by a feedback component 1646 of the apparatus 1602 of FIG. 16. The negative feedback may include HARQ NACK feedback. The HARQ feedback may be at a transport block level, at a code block level, or at a code block group level.

At 712, the first sidelink device retransmits the at least one CB, as described in connection with the example retransmission 560 of FIG. 5. For example, 712 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 714, the first sidelink device transmits a flush indicator indicating to avoid combining a prior sidelink transmission of the at least one CB with a retransmission of the at least one CB, as described in connection with the flush indicators 524, 564 of FIG. 5. For example, 714 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

In some examples, the flush indicator comprises multiple bits. In some such examples, each bit of the multiple bits of the flush indicator may correspond to a respective code block group of the sidelink transmission. For example, a first value of an FI bit may indicate to avoid combining the retransmission of the at least one CB corresponding to the respective code block group, and a second value of the FI bit may indicate to combine the retransmission of the at least one CB corresponding to the respective code block group.

In some examples, the first sidelink device may transmit an indication of the flush indicator to a receiver. For example, at 702, the first sidelink device may transmit a configuration of a number of the multiple bits for the flush indicator, as described in connection with the example flush indicator configuration 510 of FIG. 5. For example, 702 may be performed by a configuration component 1640 of the apparatus 1602 of FIG. 16. The first sidelink device may transmit the configuration in at least one of RRC signaling, a MAC-CE, SCI, or DCI. In some examples, the number of the multiple bits for the flush indicator is based on an RRC configuration and an indication in a MAC-CE, SCI, or DCI.

At 706, the first sidelink device may transmit a first flush indicator for the sidelink transmission using a known value when the sidelink transmission is an initial sidelink transmission of the one or more CBs, as described in connection with the example flush indicator 524 of FIG. 5. For example, 706 may be performed by a flush indicator component 1644 of the apparatus 1602 of FIG. 16. In some examples, the known value is a defined value (e.g., a "1") for first transmissions and indicates to avoid combining (e.g., no combination) for the one or more code blocks of the initial transmission of the one or more code blocks.

In some examples, the flush indicator may include multiple bits (e.g., a multi-bit flush indicator field). In some examples, each bit of the multiple bits of the flush indicator may correspond to a respective code block group of the sidelink transmission. In some examples, a first value of a flush indicator bit may indicate to avoid combining (e.g., to not combine) a retransmission of code blocks corresponding to the respective code block group, and a second value of the flush indicator bit may indicate to combine the retransmission of code blocks corresponding to the respective code block group. For example, the first value of the flush indicator bit may cause the receiver to refrain from combining (or forego from combining, or skip combining) one or more code blocks.

At 708, the first sidelink device may transmit CBGTI associated with the sidelink transmission, as described in connection with the CBGTI field 526 of FIG. 5. For example, 708 may be performed by a CBGTI component 1650 of the apparatus 1602 of FIG. 16. In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be a same number of bits as a second number of the multiple bits of the flush indicator (e.g., the length of the CBGTI field (M-bits) is the same as the length of the flush indicator (N-bits)). In some such examples, a grouping of code blocks related to the CBGTI may be a same grouping as a grouping of code blocks related to the flush indicator.

Figure 8:
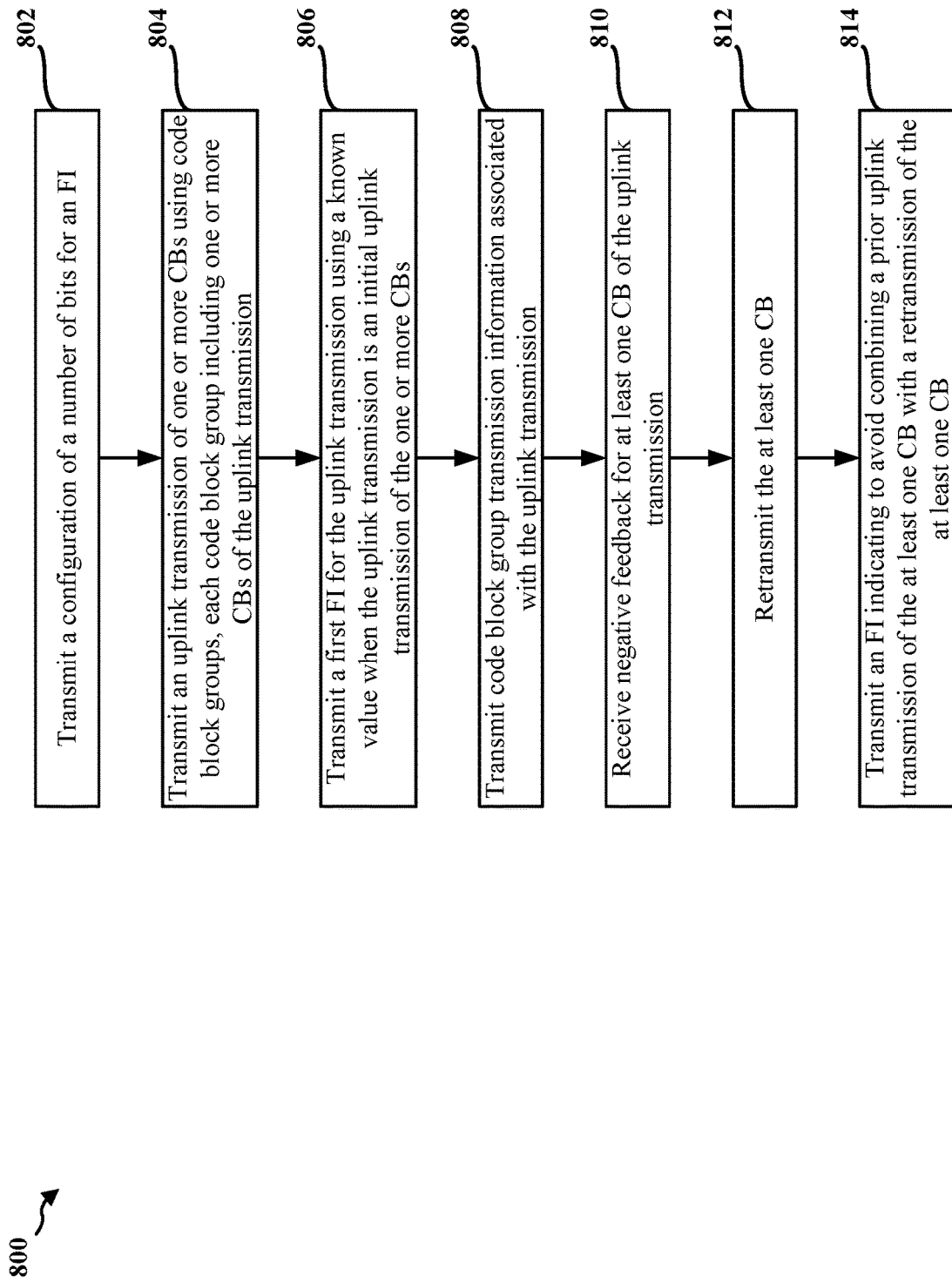
FIG. 8 is a flowchart of a method of wireless communication at a transmitter, in accordance with one or more techniques disclosed herein.

FIG. 8 is a flowchart 800 of a method of wireless communication. The method may be performed by a UE (e.g., the UE 104, the UE 350, the transmitting device 502, and/or an apparatus 1602 of FIG. 16). The method may enable a transmitter, such as a UE, to help improve decoding of packets at a receiver, such as a base station.

At 804, the UE transmits an uplink transmission of one or more CBs using code block groups, each code block group including one or more CBs of the uplink transmission, as described in connection with the example transmission 520 including the code blocks 522 of FIG. 5. For example, 804 may be performed by a first transmission component 1642 of the apparatus 1602 of FIG. 16. The code block groups may correspond to the example code block groups 440a-440c of FIG. 4. In some examples, the one or more code blocks of the uplink transmission may be comprised in a transport block, such as the example transport block 400 of FIG. 4. In some examples, the uplink transmission of the code blocks may be performed without generating code block groups.

At 810, the UE receives negative feedback for at least one CB of the uplink transmission, as described in connection with the example HARQ feedback 540 of FIG. 5. For example, 810 may be performed by a feedback component 1646 of the apparatus 1602 of FIG. 16. The negative feedback may include HARQ NACK feedback. The HARQ feedback may be at a transport block level, at a code block level, or at a code block group level.

At 812, the UE retransmits the at least one CB, as described in connection with the example retransmission 560 of FIG. 5. For example, 812 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 814, the UE transmits a flush indicator indicating to avoid combining a prior uplink transmission of the at least one CB with a retransmission of the at least one CB, as described in connection with the flush indicators 524, 564 of FIG. 5. For example, 814 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

In some examples, the flush indicator comprises multiple bits. In some such examples, each bit of the multiple bits of the flush indicator may correspond to a respective code block group of the uplink transmission. For example, a first value of an FI bit may indicate to avoid combining the retransmission of the at least one CB corresponding to the respective code block group, and a second value of the FI bit may indicate to combine the retransmission of the at least one CB corresponding to the respective code block group.

In some examples, the UE may transmit an indication of the flush indicator to a receiver. For example, at 802, the UE may transmit a configuration of a number of the multiple bits for the flush indicator, as described in connection with the example flush indicator configuration 510 of FIG. 5. For example, 802 may be performed by a configuration component 1640 of the apparatus 1602 of FIG. 16. The UE may transmit the configuration in at least one of RRC signaling, a MAC-CE, SCI, or DCI. In some examples, the number of the multiple bits for the flush indicator is based on an RRC configuration and an indication in a MAC-CE, SCI, or DCI.

At 806, the UE may transmit a first flush indicator for the uplink transmission using a known value when the uplink transmission is an initial uplink transmission of the one or more CBs, as described in connection with the example flush indicator 524 of FIG. 5. For example, 806 may be performed by a flush indicator component 1644 of the apparatus 1602 of FIG. 16. In some examples, the known value is a defined value (e.g., a "1") for first transmissions and indicates to avoid combining (e.g., no combination) for the one or more code blocks of the initial transmission of the one or more code blocks.

In some examples, the flush indicator may include multiple bits (e.g., a multi-bit flush indicator field). In some examples, each bit of the multiple bits of the flush indicator may correspond to a respective code block group of the uplink transmission. In some examples, a first value of a flush indicator bit may indicate to avoid combining (e.g., to not combine) a retransmission of code blocks corresponding to the respective code block group, and a second value of the flush indicator bit may indicate to combine the retransmission of code blocks corresponding to the respective code block group. For example, the first value of the flush indicator bit may cause the receiver to refrain from combining (or forego from combining, or skip combining) one or more code blocks.

At 808, the UE may transmit CBGTI associated with the uplink transmission, as described in connection with the CBGTI field 526 of FIG. 5. For example, 808 may be performed by a CBGTI component 1650 of the apparatus 1602 of FIG. 16. In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be a same number of bits as a second number of the multiple bits of the flush indicator (e.g., the length of the CBGTI field (M-bits) is the same as the length of the flush indicator (N-bits)). In some such examples, a grouping of code blocks related to the CBGTI may be a same grouping as a grouping of code blocks related to the flush indicator.

Figure 9:
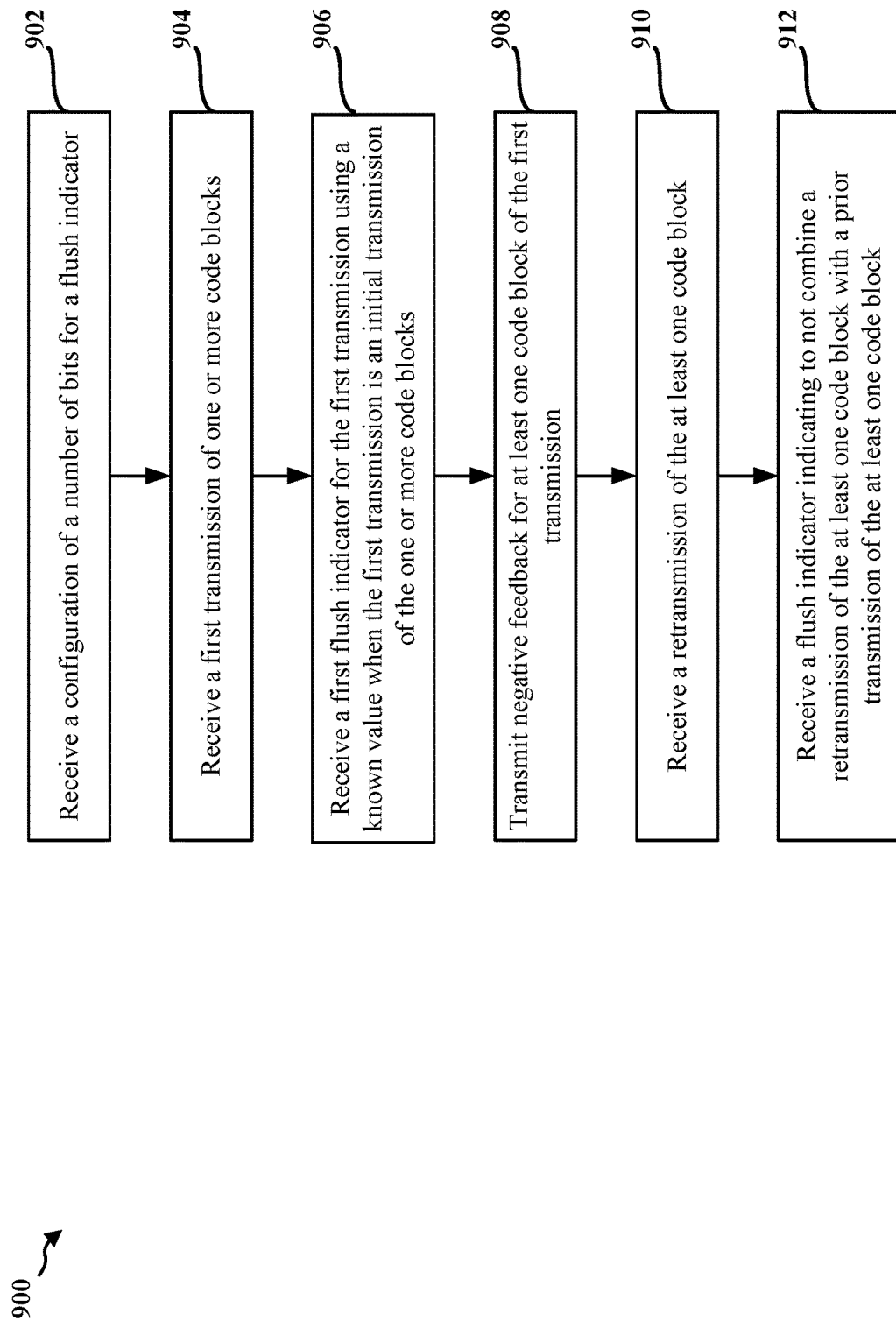
FIG. 9 is a flowchart of a method of wireless communication at a receiver, in accordance with one or more techniques disclosed herein.

FIG. 9 is a flowchart 900 of a method of wireless communication. The method may be performed by a receiver (e.g., the receiving device 504 and/or an apparatus 1602 of FIG. 16). Aspects of the receiver may be implemented by a base station (e.g., the base station 102/180 and/or the base station 310) or a UE (e.g., the UE 104 and/or the UE 350). The UE may transmit to a base station, for example, using a Uu interface, or may transmit to another UE, for example, using sidelink. The method may enable a transmitter, such as a base station, to help improve decoding of packets at a receiver, such as a UE.

At 902, the receiver may receive a configuration of a number of bits for a flush indicator, as described above in connection with the flush indicator configuration 510 of FIG. 5. For example, 902 may be performed by a configuration component 1640 of the apparatus 1602 of FIG. 16. The configuration of the number of bits may indicate that the flush indicator is a single-bit indicator or a multi-bit indicator. In some examples, the configuration of the number of bits may be received in at least one of RRC signaling, a MAC-CE, or DCI. In some examples, the number of the bits for the flush indicator may be based on an RRC configuration and an indication in a MAC-CE or DCI.

At 904, the receiver receives a first transmission of one or more code blocks, as described above in connection with the example transmission 520 including the code blocks 522 of FIG. 5. For example, 904 may be performed by a first transmission component 1642 of the apparatus 1602 of FIG. 16. In some examples, the one or more code blocks of the first transmission may be comprised in a transport block (TB), such as the example transport block 400 of FIG. 4. In some examples, the first transmission of the code blocks may be performed without generating code block groups.

In some examples, the first transmission of the code blocks may be performed using code block groups, such as the example code block groups 440 of FIG. 4. In some such examples, each code block group may correspond to one or more of the at least one code block of the first transmission. In some examples, the flush indicator may include multiple bits (e.g., a multi-bit flush indicator field). In some examples, each of the multiple bits of the flush indicator may correspond to a respective code block group of the first transmission. In some examples, a first value of a flush indicator bit may indicate to not combine a retransmission of code blocks corresponding to the respective code block group, and a second value of the flush indicator bit may indicate to combine the retransmission of code blocks corresponding to the respective code block group. For example, the flush indicator may be set to a first value (e.g., a "1") to indicate to the receiver to refrain from combining (or forego from combining, or skip combining) one or more code blocks of the retransmission with a prior transmission. In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be the same as a second number of the multiple bits of the flush indicator (e.g., the length of the CBGTI field (M-bits) is the same as the length of the flush indicator (N-bits)). In some such examples, a grouping of code blocks related to the CBGTI may be the same as a grouping of code blocks related to the flush indicator.

At 906, the receiver may receive a first flush indicator for the first transmission using a known value when the first transmission is an initial transmission of the one or more code blocks, as described above in connection with the flush indicator 524 of FIG. 5. For example, 906 may be performed by a flush indicator component 1644 of the apparatus 1602 of FIG. 16. In some examples, the known value is a defined value (e.g., a "1") for first transmissions and indicates to avoid combining the one or more code blocks of the initial transmission of the one or more code blocks.

At 908, the receiver transmits negative feedback for at least one code block of the first transmission, as described above in connection with the HARQ feedback 540 of FIG. 5. For example, 908 may be performed by a feedback component 1646 of the apparatus 1602 of FIG. 16. The negative feedback may include HARQ NACK feedback. The HARQ feedback may be at a transport block level, at a code block level, or at a code block group level.

At 910, the receiver receives a retransmission of the at least one code block, as described above in connection with the retransmission 560 of FIG. 5. For example, 910 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 912, the receiver receives a flush indicator indicating to not combine a retransmission of the at least one code block with a prior transmission of the at least one code block, as described above in connection with the flush indicators 524, 564 of FIG. 5. For example, 912 may be performed by the flush indicator component 1644 of the apparatus 1602 of FIG. 16. For example, the flush indicator may be set to the first value (e.g., a "1") to indicate to the receiver to refrain from combining (or forego from combining, or skip combining) one or more code blocks of the retransmission with a prior transmission.

Figure 10:
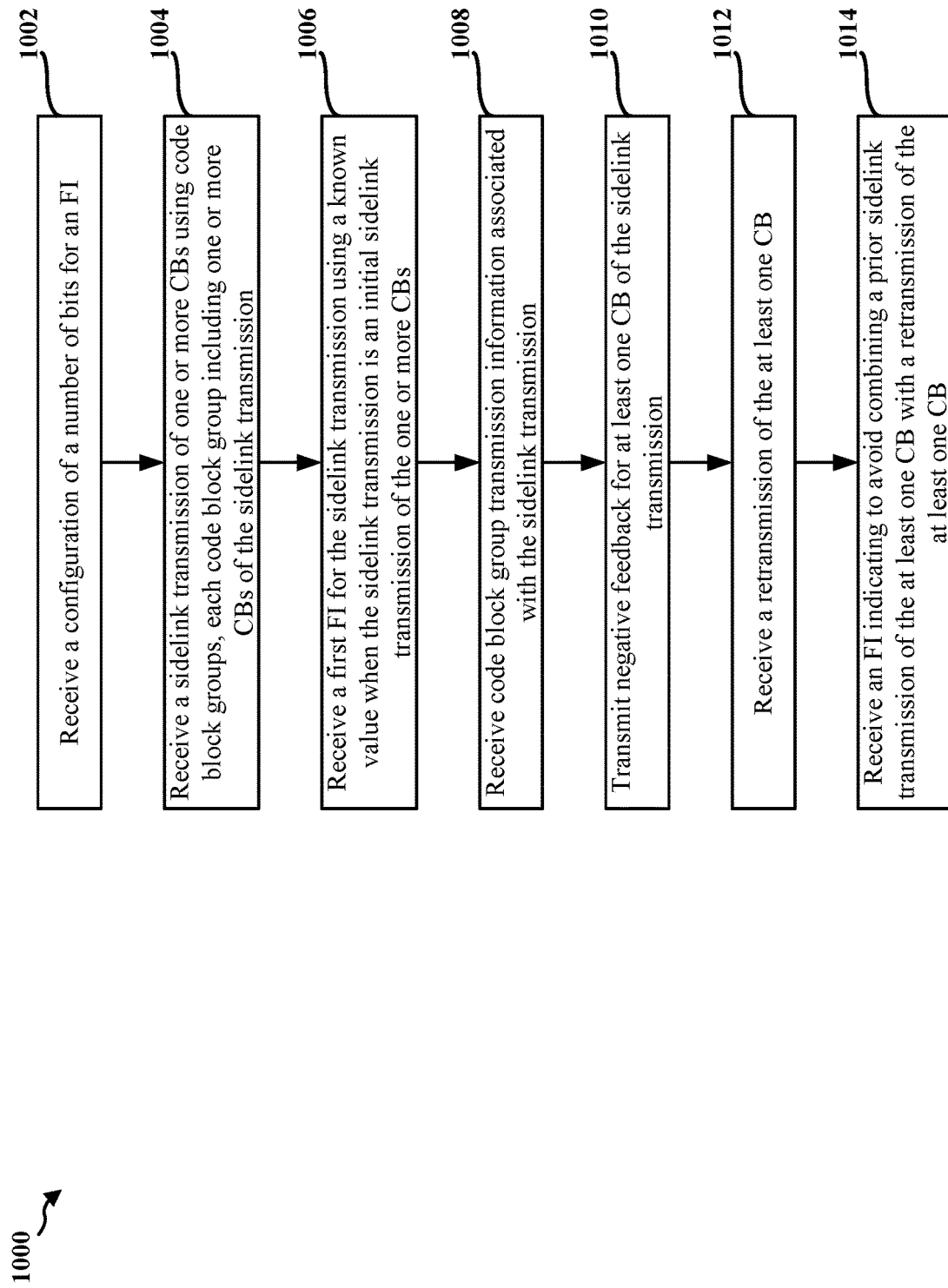
FIG. 10 is a flowchart of a method of wireless communication at a receiver, in accordance with one or more techniques disclosed herein.

FIG. 10 is a flowchart 1000 of a method of wireless communication. The method may be performed by a second sidelink device, such as a receiving UE (e.g., the UE 104, the UE 350, the receiving device 504, and/or an apparatus 1602 of FIG. 16). The method may enable a transmitter, such as a first sidelink device, to help improve decoding of packets at a receiver, such as a second sidelink device.

At 1004, the second sidelink device receives, from a first sidelink device, a sidelink transmission of one or more CBs using code block groups, each code block group including one or more CBs of the sidelink transmission, as described in connection with the example transmission 520 including the code blocks 522 of FIG. 5. For example, 1004 may be performed by a first transmission component 1642 of the apparatus 1602 of FIG. 16. The code block groups may correspond to the example code block groups 440*a*-440*c* of FIG. 4. In some examples, the one or more code blocks of the sidelink transmission may be comprised in a transport block, such as the example transport block 400 of FIG. 4. In some examples, the sidelink transmission of the code blocks may be performed without generating code block groups.

At 1010, the second sidelink device transmits negative feedback for at least one CB of the sidelink transmission, as described in connection with the example HARQ feedback 540 of FIG. 5. For example, 1010 may be performed by a feedback component 1646 of the apparatus 1602 of FIG. 16. The negative feedback may include HARQ NACK feedback. The HARQ feedback may be at a transport block level, at a code block level, or at a code block group level.

At 1012, the second sidelink device receives a retransmission of the at least one CB, as described in connection with the example retransmission 560 of FIG. 5. For example, 1012 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1014, the second sidelink device receives a flush indicator indicating to avoid combining a prior sidelink transmission of the at least one CB with a retransmission of the at least one CB, as described in connection with the flush indicators 524, 564 of FIG. 5. For example, 1014 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

In some examples, the flush indicator comprises multiple bits. In some such examples, each bit of the multiple bits of the flush indicator may correspond to a respective code block group of the sidelink transmission. For example, a first value of an FI bit may indicate to avoid combining the retransmission of the at least one CB corresponding to the respective code block group, and a second value of the FI bit may indicate to combine the retransmission of the at least one CB corresponding to the respective code block group.

In some examples, the second sidelink device may receive an indication of the flush indicator from the transmitter. For example, at 1002, the second sidelink device may receive a configuration of a number of the multiple bits for the flush indicator, as described in connection with the example flush indicator configuration 510 of FIG. 5. For example, 1002 may be performed by a configuration component 1640 of the apparatus 1602 of FIG. 16. The second sidelink device may receive the configuration in at least one of RRC signaling, a MAC-CE, SCI, or DCI. In some examples, the number of the multiple bits for the flush indicator is based on an RRC configuration and an indication in a MAC-CE, SCI, or DCI.

At 1006, the second sidelink device may receive a first flush indicator for the sidelink transmission using a known value when the sidelink transmission is an initial sidelink transmission of the one or more CBs, as described in connection with the example flush indicator 524 of FIG. 5. For example, 1006 may be performed by a flush indicator component 1644 of the apparatus 1602 of FIG. 16. In some examples, the known value is a defined value (e.g., a "1") for first transmissions and indicates to avoid combining (e.g., no combination) for the one or more code blocks of the initial transmission of the one or more code blocks.

In some examples, the flush indicator may include multiple bits (e.g., a multi-bit flush indicator field). In some examples, each bit of the multiple bits of the flush indicator may correspond to a respective code block group of the sidelink transmission. In some examples, a first value of a flush indicator bit may indicate to avoid combining (e.g., to not combine) a retransmission of code blocks corresponding to the respective code block group, and a second value of the flush indicator bit may indicate to combine the retransmission of code blocks corresponding to the respective code block group. For example, the first value of the flush indicator bit may cause the receiver to refrain from combining (or forego from combining, or skip combining) one or more code blocks.

At 1008, the second sidelink device may receive CBGTI associated with the sidelink transmission, as described in connection with the CBGTI field 526 of FIG. 5. For example, 1008 may be performed by a CBGTI component 1650 of the apparatus 1602 of FIG. 16. In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be a same number of bits as a second number of the multiple bits of the flush indicator (e.g., the length of the CBGTI field (M-bits) is the same as the length of the flush indicator (N-bits)). In some such examples, a grouping of code blocks related to the CBGTI may be a same grouping as a grouping of code blocks related to the flush indicator.

Figure 11:
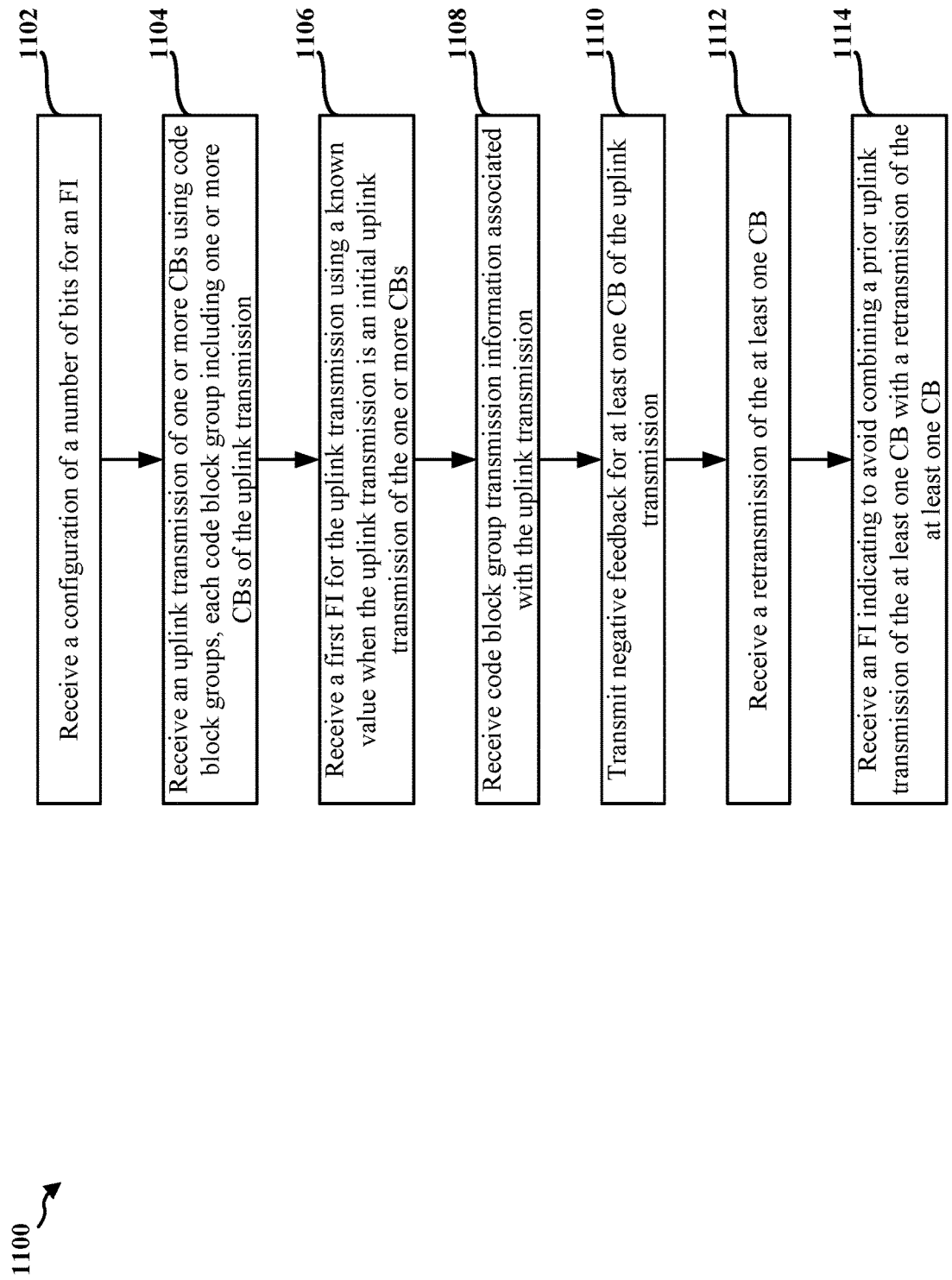
FIG. 11 is a flowchart of a method of wireless communication at a receiver, in accordance with the teachings disclosed herein.

FIG. 11 is a flowchart 1100 of a method of wireless communication. The method may be performed by a receiver (e.g., the receiving device 504 and/or an apparatus 1602 of FIG. 16). Aspects of the receiver may be implemented by a base station (e.g., the base station 102/180 and/or the base station 310) or a UE (e.g., the UE 104 and/or the UE 350). The UE may transmit to a base station, for example, using a Uu interface, or may transmit to another UE, for example, using sidelink.

At 1104, the receiver receives an uplink transmission of one or more CBs using code block groups, each code block group including one or more CBs of the uplink transmission, as described in connection with the example transmission 520 including the code blocks 522 of FIG. 5. For example, 1104 may be performed by a first transmission component 1642 of the apparatus 1602 of FIG. 16. The code block groups may correspond to the example code block groups 440a-440c of FIG. 4. In some examples, the one or more code blocks of the uplink transmission may be comprised in a transport block, such as the example transport block 400 of FIG. 4. In some examples, the uplink transmission of the code blocks may be performed without generating code block groups.

At 1110, the receiver transmits negative feedback for at least one CB of the uplink transmission, as described in connection with the example HARQ feedback 540 of FIG. 5. For example, 1110 may be performed by a feedback component 1646 of the apparatus 1602 of FIG. 16. The negative feedback may include HARQ NACK feedback. The HARQ feedback may be at a transport block level, at a code block level, or at a code block group level.

At 1112, the receiver receives a retransmission of the at least one CB, as described in connection with the example retransmission 560 of FIG. 5. For example, 1112 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1114, the receiver receives a flush indicator indicating to avoid combining a prior uplink transmission of the at least one CB with a retransmission of the at least one CB, as described in connection with the flush indicators 524, 564 of FIG. 5. For example, 1114 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

In some examples, the flush indicator comprises multiple bits. In some such examples, each bit of the multiple bits of the flush indicator may correspond to a respective code block group of the uplink transmission. For example, a first value of an FI bit may indicate to avoid combining the retransmissions of the at least one CB corresponding to the respective code block group, and a second value of the FI bit may indicate to combine the retransmission of the at least one CB corresponding to the respective code block group.

In some examples, the receiver may receive an indication of the flush indicator from a transmitter. For example, at 1102, the receiver may receive a configuration of a number of the multiple bits for the flush indicator, as described in connection with the example flush indicator configuration 510 of FIG. 5. For example, 1102 may be performed by a configuration component 1640 of the apparatus 1602 of FIG. 16. The receiver may receive the configuration in at least one of RRC signaling, a MAC-CE, SCI, or DCI. In some examples, the number of the multiple bits for the flush indicator is based on an RRC configuration and an indication in a MAC-CE, SCI, or DCI.

At 1106, the receiver may receive a first flush indicator for the uplink transmission using a known value when the uplink transmission is an initial uplink transmission of the one or more CBs, as described in connection with the example flush indicator 524 of FIG. 5. For example, 1106 may be performed by a flush indicator component 1644 of the apparatus 1602 of FIG. 16. In some examples, the known value is a defined value (e.g., a "1") for first transmissions and indicates to avoid combining (e.g., no combination) for the one or more code blocks of the initial transmission of the one or more code blocks.

In some examples, the flush indicator may include multiple bits (e.g., a multi-bit flush indicator field). In some examples, each bit of the multiple bits of the flush indicator may correspond to a respective code block group of the uplink transmission. In some examples, a first value of a flush indicator bit may indicate to avoid combining (e.g., to not combine) a retransmission of code blocks corresponding to the respective code block group, and a second value of the flush indicator bit may indicate to combine the retransmission of code blocks corresponding to the respective code block group. For example, the first value of the flush indicator bit may cause the receiver to refrain from combining (or forego from combining, or skip combining) one or more code blocks.

At 1108, the receiver may receive CBGTI associated with the uplink transmission, as described in connection with the CBGTI field 526 of FIG. 5. For example, 1108 may be performed by a CBGTI component 1650 of the apparatus 1602 of FIG. 16. In some examples, a first number of bits in a CBGTI may be different than a second number of the multiple bits of the flush indicator (e.g., the length of the CBGTI field (M-bits) is different than the length of the flush indicator (N-bits)). In some such examples, a grouping of code blocks related to the CBGTI may be different than a grouping of code blocks related to the flush indicator. In some examples, a first number of bits in a CBGTI may be a same number of bits as a second number of the multiple bits of the flush indicator (e.g., the length of the CBGTI field (M-bits) is the same as the length of the flush indicator (N-bits)). In some such examples, a grouping of code blocks related to the CBGTI may be a same grouping as a grouping of code blocks related to the flush indicator.

Figure 12:
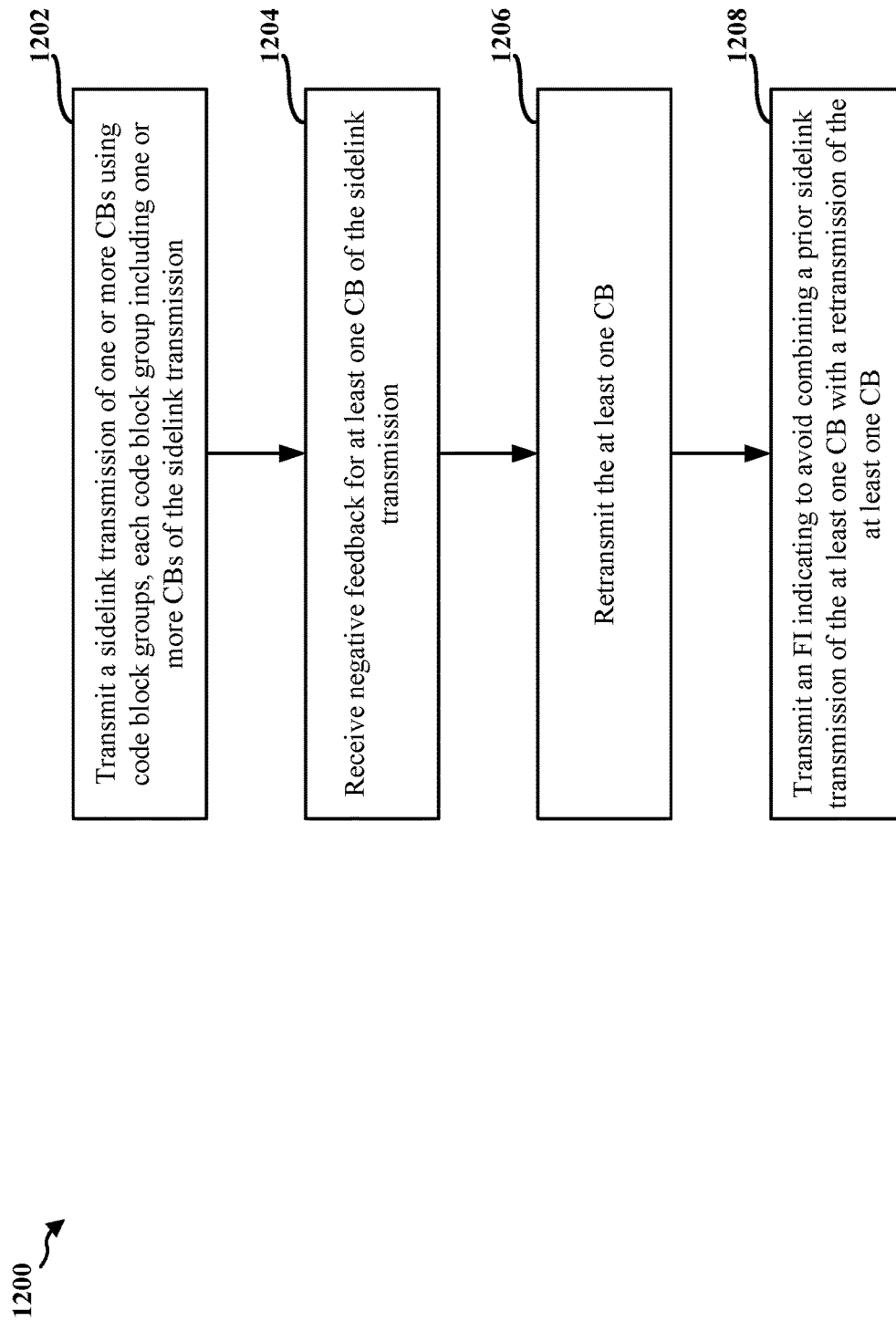
FIG. 12 is a flowchart of a method of wireless communication at a transmitter, in accordance with one or more techniques disclosed herein.

FIG. 12 is a flowchart 1200 of a method of wireless communication. The method may be performed by a first sidelink device, such as a transmitting UE (e.g., the UE 104, the UE 350, the transmitting device 502, and/or an apparatus 1602 of FIG. 16). The method may enable a transmitter, such as a first sidelink device, to help improve decoding of packets at a receiver, such as a second sidelink device.

At 1202, the first sidelink device transmits a sidelink transmission of one or more CBs using code block groups, each code block group including one or more CBs of the sidelink transmission, as described in connection with the example transmission 520 including the code blocks 522 of FIG. 5. For example, 1202 may be performed by a first transmission component 1642 of the apparatus 1602 of FIG. 16. The code block groups may correspond to the example code block groups 440a-440c of FIG. 4. In some examples, the one or more code blocks of the sidelink transmission may be comprised in a transport block, such as the example transport block 400 of FIG. 4. In some examples, the sidelink transmission of the code blocks may be performed without generating code block groups.

At 1204, the first sidelink device receives negative feedback for at least one CB of the sidelink transmission, as described in connection with the example HARQ feedback 540 of FIG. 5. For example, 1204 may be performed by a feedback component 1646 of the apparatus 1602 of FIG. 16. The negative feedback may include HARQ NACK feedback. The HARQ feedback may be at a transport block level, at a code block level, or at a code block group level.

At 1206, the first sidelink device retransmits the at least one CB, as described in connection with the example retransmission 560 of FIG. 5. For example, 1206 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1208, the first sidelink device transmits a flush indicator indicating to avoid combining a prior sidelink transmission of the at least one CB with a retransmission of the at least one CB, as described in connection with the flush indicators 524, 564 of FIG. 5. For example, 1208 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

Figure 13:
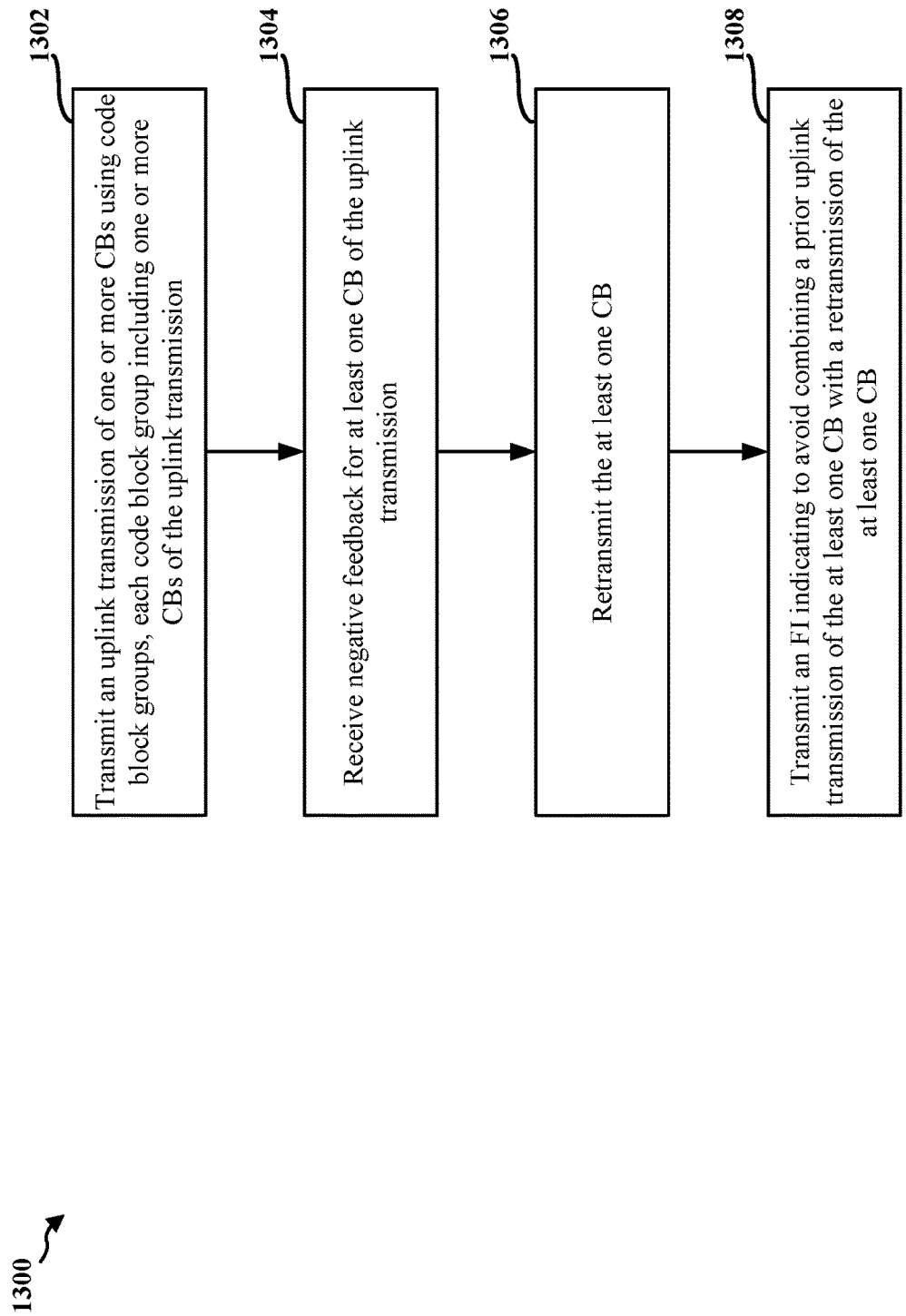
FIG. 13 is a flowchart of a method of wireless communication at a transmitter, in accordance with one or more techniques disclosed herein.

FIG. 13 is a flowchart 1300 of a method of wireless communication. The method may be performed by a UE (e.g., the UE 104, the UE 350, the transmitting device 502, and/or an apparatus 1602 of FIG. 16). The method may enable a transmitter, such as a UE, to help improve decoding of packets at a receiver, such as a base station.

At 1302, the UE transmits an uplink transmission of one or more CBs using code block groups, each code block group including one or more CBs of the uplink transmission, as described in connection with the example transmission 520 including the code blocks 522 of FIG. 5. For example, 1302 may be performed by a first transmission component 1642 of the apparatus 1602 of FIG. 16. The code block groups may correspond to the example code block groups 440a-440c of FIG. 4. In some examples, the one or more code blocks of the uplink transmission may be comprised in a transport block, such as the example transport block 400 of FIG. 4. In some examples, the uplink transmission of the code blocks may be performed without generating code block groups.

At 1304, the UE receives negative feedback for at least one CB of the uplink transmission, as described in connection with the example HARQ feedback 540 of FIG. 5. For example, 1304 may be performed by a feedback component 1646 of the apparatus 1602 of FIG. 16. The negative feedback may include HARQ NACK feedback. The HARQ feedback may be at a transport block level, at a code block level, or at a code block group level.

At 1306, the UE retransmits the at least one CB, as described in connection with the example retransmission 560 of FIG. 5. For example, 1306 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1308, the UE transmits a flush indicator indicating to avoid combining a prior uplink transmission of the at least one CB with a retransmission of the at least one CB, as described in connection with the flush indicators 524, 564 of FIG. 5. For example, 1308 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

Figure 14:
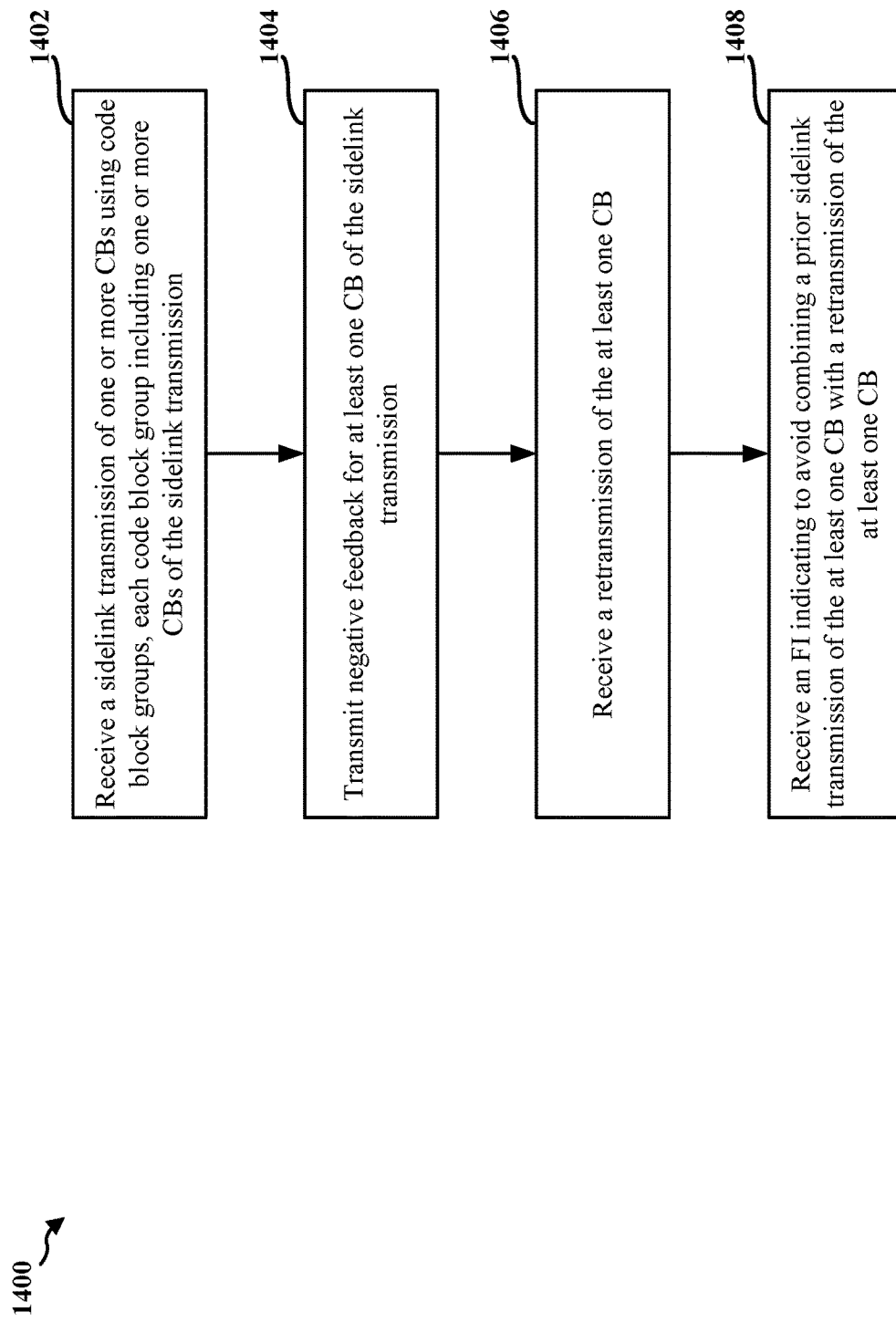
FIG. 14 is a flowchart of a method of wireless communication at a receiver, in accordance with one or more techniques disclosed herein.

FIG. 14 is a flowchart 1400 of a method of wireless communication. The method may be performed by a second sidelink device, such as a receiving UE (e.g., the UE 104, the UE 350, the receiving device 504, and/or an apparatus 1602 of FIG. 16). The method may enable a transmitter, such as a first sidelink device, to help improve decoding of packets at a receiver, such as a second sidelink device.

At 1402, the second sidelink device receives, from a first sidelink device, a sidelink transmission of one or more CBs using code block groups, each code block group including one or more CBs of the sidelink transmission, as described in connection with the example transmission 520 including the code blocks 522 of FIG. 5. For example, 1402 may be performed by a first transmission component 1642 of the apparatus 1602 of FIG. 16. The code block groups may correspond to the example code block groups 440a-440c of FIG. 4. In some examples, the one or more code blocks of the sidelink transmission may be comprised in a transport block, such as the example transport block 400 of FIG. 4. In some examples, the sidelink transmission of the code blocks may be performed without generating code block groups.

At 1404, the second sidelink device transmits negative feedback for at least one CB of the sidelink transmission, as described in connection with the example HARQ feedback 540 of FIG. 5. For example, 1404 may be performed by a feedback component 1646 of the apparatus 1602 of FIG. 16. The negative feedback may include HARQ NACK feedback. The HARQ feedback may be at a transport block level, at a code block level, or at a code block group level.

At 1406, the second sidelink device receives a retransmission of the at least one CB, as described in connection with the example retransmission 560 of FIG. 5. For example, 1406 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1408, the second sidelink device receives a flush indicator indicating to avoid combining a prior sidelink transmission of the at least one CB with a retransmission of the at least one CB, as described in connection with the flush indicators 524, 564 of FIG. 5. For example, 1408 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

Figure 15:
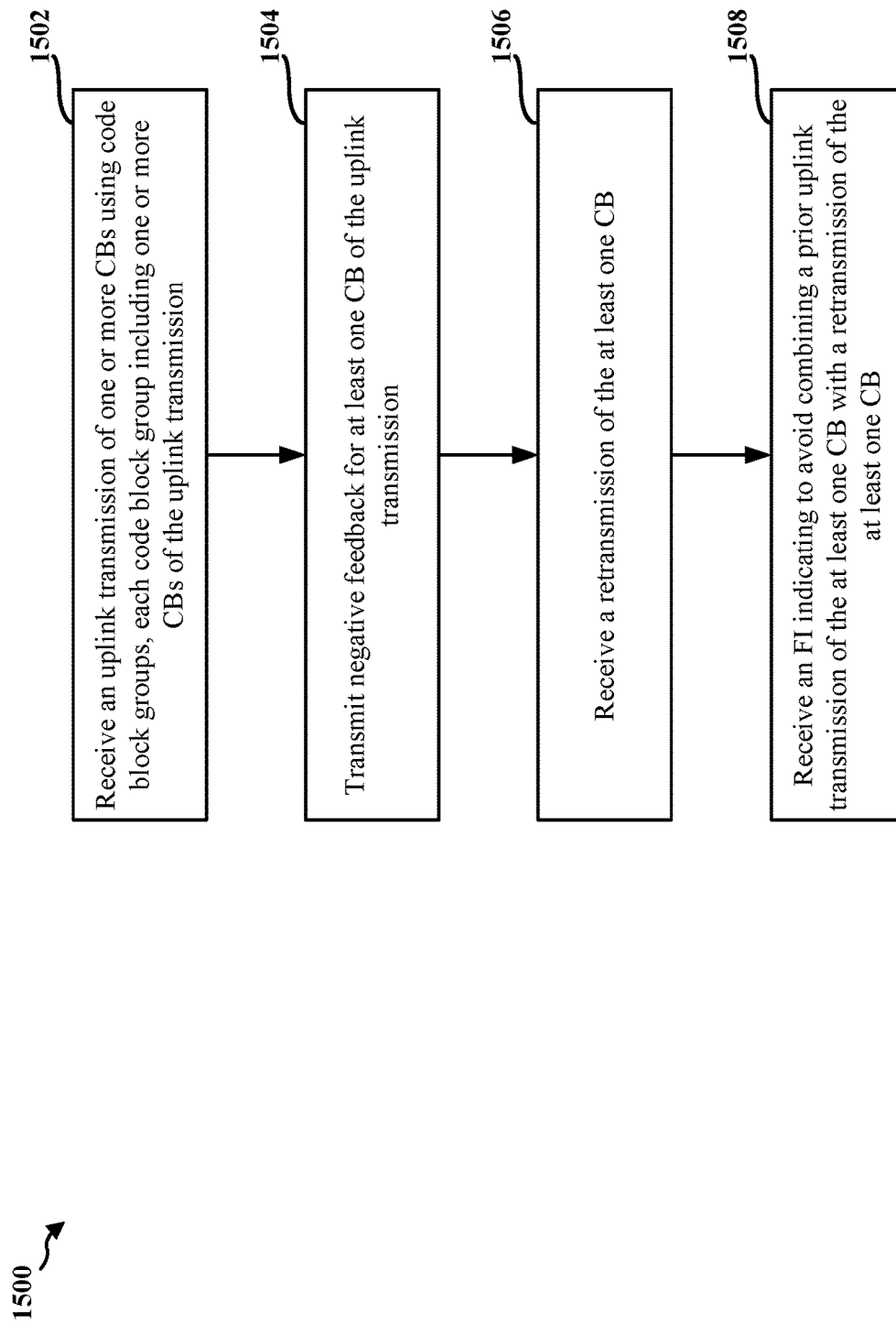
FIG. 15 is a flowchart of a method of wireless communication at a receiver, in accordance with one or more techniques disclosed herein.

FIG. 15 is a flowchart 1500 of a method of wireless communication. The method may be performed by a receiver (e.g., the receiving device 504 and/or an apparatus 1602 of FIG. 16). Aspects of the receiver may be implemented by a base station (e.g., the base station 102/180 and/or the base station 310) or a UE (e.g., the UE 104 and/or the UE 350). The UE may transmit to a base station, for example, using a Uu interface, or may transmit to another UE, for example, using sidelink.

At 1502, the receiver receives an uplink transmission of one or more CBs using code block groups, each code block group including one or more CBs of the uplink transmission, as described in connection with the example transmission 520 including the code blocks 522 of FIG. 5. For example, 1502 may be performed by a first transmission component 1642 of the apparatus 1602 of FIG. 16. The code block groups may correspond to the example code block groups 440a-440c of FIG. 4. In some examples, the one or more code blocks of the uplink transmission may be comprised in a transport block, such as the example transport block 400 of FIG. 4. In some examples, the uplink transmission of the code blocks may be performed without generating code block groups.

At 1504, the receiver transmits negative feedback for at least one CB of the uplink transmission, as described in connection with the example HARQ feedback 540 of FIG. 5. For example, 1504 may be performed by a feedback component 1646 of the apparatus 1602 of FIG. 16. The negative feedback may include HARQ NACK feedback. The HARQ feedback may be at a transport block level, at a code block level, or at a code block group level.

At 1506, the receiver receives a retransmission of the at least one CB, as described in connection with the example retransmission 560 of FIG. 5. For example, 1506 may be performed by a retransmission component 1648 of the apparatus 1602 of FIG. 16. The retransmission may include the at least one code block, a flush indicator (e.g., the flush indicator 564), and/or CBGTI (e.g., the CBGTI field 566).

At 1508, the receiver receives a flush indicator indicating to avoid combining a prior uplink transmission of the at least one CB with a retransmission of the at least one CB, as described in connection with the flush indicators 524, 564 of FIG. 5. For example, 1508 may be performed by a flush indicator component 1644 of the apparatus 1602 of FIG. 16. For example, the flush indicator may be set to the first value (e.g., a "1") to indicate to refrain from combining (or avoid combining, forego from combining, or skip combining) one or more code blocks of the retransmission with a prior transmission.

Figure 16:
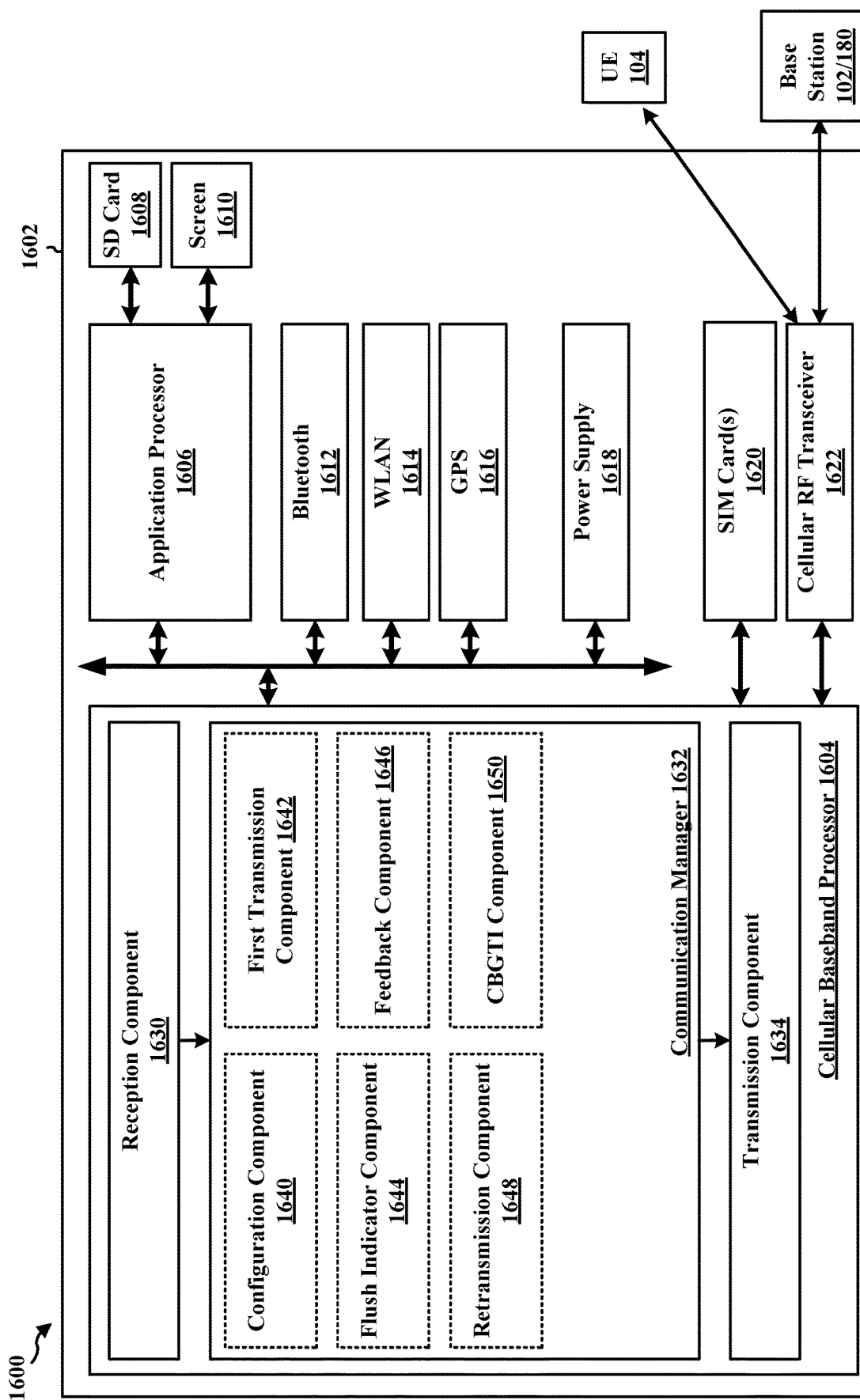
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or base station 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see the UE 350 of FIG. 3) and include the additional modules of the apparatus 1602.

The communication manager 1632 includes a configuration component 1640 that is configured to transmit a configuration of a number of bits for a flush indicator, for example, as described in connection with 602 of FIG. 6. The example configuration component 1640 may also be configured to transmit a configuration of a number of the multiple bits for the flush indicator, for example, as described in connection with 702 of FIG. 7. The example configuration component 1640 may also be configured to transmit a configuration of a number of the multiple bits for the flush indicator, for example, as described in connection with 802 of FIG. 8. The example configuration component 1640 may also be configured to receive a configuration of a number of bits for a flush indicator, for example, as described in connection with 902 of FIG. 9. The example configuration component 1640 may also be configured to receive a configuration of a number of the multiple bits for the flush indicator, for example, as described in connection with 1002 of FIG. 10. The example configuration component 1640 may also be configured to receive a configuration of a number of the multiple bits for the flush indicator, for example, as described in connection with 1102 of FIG. 11.

The communication manager 1632 also includes a first transmission component 1642 that is configured to transmit a first transmission of one or more code blocks, for example, as described in connection with 604 of FIG. 6. The example first transmission component 1642 may also be configured to transmit a sidelink transmission of one or more CBs using code block groups, for example, as described in connection with 704 of FIG. 7 and/or 1202 of FIG. 12. The example first transmission component 1642 may also be configured to transmit an uplink transmission of one or more CBs using code block groups, for example, as described in connection with 804 of FIG. 8 and/or 1302 of FIG. 13. The example first transmission component 1642 may also be configured to receive a first transmission of one or more code blocks, for example, as described in connection with 904 of FIG. 9. The example first transmission component 1642 may also be configured to receive, from a first sidelink device, a sidelink transmission of one or more CBs using code block groups, each code block group including one or more CBs of the sidelink transmission, for example, as described in connection with 1004 of FIG. 10 and/or 1402 of FIG. 14. The example first transmission component 1642 may also be configured to receive an uplink transmission of one or more CBs using code block groups, each code block group including one or more CBs of the uplink transmission, for example, as described in connection with 1104 of FIG. 11 and/or 1502 of FIG. 15.

The communication manager 1632 also includes a flush indicator component 1644 that is configured to transmit a first flush indicator for the first transmission using a known value when the first transmission is an initial transmission of the one or more code blocks, for example, as described in connection with 606 of FIG. 6. The example flush indicator component 1644 may also be configured to transmit a flush indicator indicating to not combine a retransmission of the at least one code block with a prior transmission of the at least one code block, for example, as described in connection with 612 of FIG. 6. The example flush indicator component 1644 may also be configured to transmit a flush indicator indicating to avoid combining a prior sidelink transmission of the at least one CB with a retransmission of the at least one CB, for example, as described in connection with 714 of FIG. 7 and/or 1208 of FIG. 12. The example flush indicator component 1644 may also be configured to transmit a first flush indicator for the sidelink transmission using a known value when the sidelink transmission is an initial sidelink transmission of the one or more CBs, for example, as described in connection with 706 of FIG. 7. The example flush indicator component 1644 may also be configured to transmit a flush indicator indicating to avoid combining a prior uplink transmission of the at least one CB with a retransmission of the at least one CB, for example, as described in connection with 814 of FIG. 8 and/or 1308 of FIG. 13. The example flush indicator component 1644 may also be configured to transmit a first flush indicator for the uplink transmission using a known value when the uplink transmission is an initial uplink transmission of the one or more CBs, for example, as described in connection with 806 of FIG. 8. The example flush indicator component 1644 may also be configured to receive a first flush indicator for the first transmission using a known value when the first transmission is an initial transmission of the one or more code blocks, for example, as described in connection with 906 of FIG. 9. The example flush indicator component 1644 may also be configured to receive a flush indicator indicating to not combine a retransmission of the at least one code block with a prior transmission of the at least one code block, for example, as described in connection with 912 of FIG. 9. The example flush indicator component 1644 may also be configured to receive a flush indicator indicating to avoid combining a prior sidelink transmission of the at least one CB with a retransmission of the at least one CB, for example, as described in connection with 1014 of FIG. 10 and/or 1408 of FIG. 14. The example flush indicator component 1644 may also be configured to receive a first flush indicator for the sidelink transmission using a known value when the sidelink transmission is an initial sidelink transmission of the one or more CBs, for example, as described in connection with 1006 of FIG. 10. The example flush indicator component 1644 may also be configured to receive a flush indicator indicating to avoid combining a prior uplink transmission of the at least one CB with a retransmission of the at least one CB, for example, as described in connection with 1114 of FIG. 11 and/or 1508 of FIG. 15. The example flush indicator component 1644 may also be configured to receive a first flush indicator for the uplink transmission using a known value when the uplink transmission is an initial uplink transmission of the one or more CBs, for example, as described in connection with 1106 of FIG. 11.

The communication manager 1632 also includes a feedback component 1646 that is configured to receive negative feedback for at least one code block of the first transmission, for example, as described in connection with 608 of FIG. 6. The example feedback component 1646 may also be configured to device receive negative feedback for at least one CB of the sidelink transmission, for example, as described in connection with 710 of FIG. 7 and/or 1204 of FIG. 12. The example feedback component 1646 may also be configured to device receive negative feedback for at least one CB of the uplink transmission, for example, as described in connection with 810 of FIG. 8 and/or 1304 of FIG. 13. The example feedback component 1646 may also be configured to transmit negative feedback for at least one code block of the first transmission, for example, as described in connection with 908 of FIG. 9. The example feedback component 1646 may also be configured to transmit negative feedback for at least one CB of the sidelink transmission, for example, as described in connection with 1010 of FIG. 10 and/or 1404 of FIG. 14. The example feedback component 1646 may also be configured to transmit negative feedback for at least one CB of the uplink transmission, for example, as described in connection with 1110 of FIG. 11 and/or 1504 of FIG. 15.

The communication manager 1632 also includes a retransmission component 1648 that is configured to retransmit the at least one code block, for example, as described in connection with 610 of FIG. 6. The example retransmission component 1648 may also be configured to device retransmit the at least one CB, for example, as described in connection with 712 of FIG. 7 and/or 1206 of FIG. 12. The example retransmission component 1648 may also be configured to device retransmit the at least one CB, for example, as described in connection with 812 of FIG. 8 and/or 1306 of FIG. 13. The example retransmission component 1648 may also be configured to receives a retransmission of the at least one code block, for example, as described in connection with 910 of FIG. 9. The example retransmission component 1648 may also be configured to receive a retransmission of the at least one CB, for example, as described in connection with 1012 of FIG. 10 and/or 1406 of FIG. 14. The example retransmission component 1648 may also be configured to receive a retransmission of the at least one CB, for example, as described in connection with 1112 of FIG. 11 and/or 1506 of FIG. 15.

The communication manager 1632 also includes a CBGTI component 1650 that is configured to transmit CBGTI associated with the sidelink transmission, for example, as described in connection with 708 of FIG. 7. The communication manager 1632 also includes a CBGTI component 1650 that is configured to transmit CBGTI associated with the uplink transmission, for example, as described in connection with 808 of FIG. 8. The example CBGTI component 1650 may also be configured to receive CBGTI associated with the sidelink transmission, for example, as described in connection with 1008 of FIG. 10. The example CBGTI component 1650 may also be configured to receive CBGTI associated with the uplink transmission, for example, as described in connection with 1108 of FIG. 11.

The apparatus may include additional components that perform each of the blocks of the algorithm in the aforementioned flowcharts of FIGS. 6 to 15. As such, each block in the aforementioned flowcharts of FIGS. 6 to 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for transmitting a first transmission of one or more code blocks (CBs). The example apparatus 1602 also includes means for receiving negative feedback for at least one CB of the first transmission. The example apparatus 1602 also includes means for retransmitting the at least one CB. The example apparatus 1602 also includes means for transmitting a flush indicator (FI) indicating to not combine a retransmission of the at least one CB with a prior transmission of the at least one CB.

In another configuration, the example apparatus 1602 also includes means for transmitting a configuration of a number of the multiple bits for the FI.

In another configuration, the example apparatus 1602 also includes means for transmitting the configuration in at least one of: radio resource control (RRC) signaling, a medium access control-control element (MAC-CE), or downlink control information (DCI).

In another configuration, the example apparatus 1602 also includes means for transmitting a first FI for the first transmission using a known value when the first transmission is an initial transmission of the one or more CBs.

In another configuration, the apparatus 1602, and in particular the cellular baseband processor 1604, includes means for receiving a first transmission of one or more code block (CBs). The example apparatus 1602 also includes means for transmitting negative feedback for at least one CB of the first transmission. The example apparatus 1602 also includes means for receiving a retransmission of the at least one CB. The example apparatus 1602 also includes means for receiving a flush indicator (FI) indicating to not combine the retransmission of the at least one CB with a prior transmission of the at least one CB.

In another configuration, the example apparatus 1602 also includes means for receiving a configuration of a number of the multiple bits for the FI.

In another configuration, the example apparatus 1602 also includes means for receiving the configuration in at least one of: radio resource control (RRC) signaling, a medium access control-control element (MAC-CE), or downlink control information (DCI).

In another configuration, the example apparatus 1602 also includes means for receiving a first FI for the first transmission using a known value when the first transmission is an initial transmission of the one or more CBs.

In another configuration, the apparatus 1602, and in particular the cellular baseband processor 1604, includes means for transmitting a sidelink transmission of one or more code blocks (CBs) using code block groups, each code block group including one or more CBs of the sidelink transmission. The example apparatus 1602 also includes means for receiving negative feedback for at least one CB of the sidelink transmission. The example apparatus 1602 also includes means for retransmitting the at least one CB. The example apparatus 1602 also includes means for transmitting a flush indicator (FI) indicating to avoid combining a prior sidelink transmission of the at least one CB with a retransmission of the at least one CB.

In another configuration, the example apparatus 1602 also includes means for transmitting a configuration of a number of the multiple bits for the FI.

In another configuration, the example apparatus 1602 also includes means for transmitting the configuration in at least one of: radio resource control (RRC) signaling, a medium access control-control element (MAC-CE), sidelink control information (SCI), or downlink control information (DCI).

In another configuration, the example apparatus 1602 also includes means for transmitting a first FI for the sidelink transmission using a known value when the sidelink transmission is an initial sidelink transmission of the one or more CBs.

In another configuration, the apparatus 1602, and in particular the cellular baseband processor 1604, includes means for transmitting an uplink transmission of one or more code blocks (CBs) using code block groups, each code block group including one or more CBs of the uplink transmission. The example apparatus 1602 also includes means for receiving negative feedback for at least one CB of the uplink transmission. The example apparatus 1602 also includes means for retransmitting the at least one CB. The example apparatus 1602 also includes means for transmitting a flush indicator (FI) indicating to avoid combining a prior uplink transmission of the at least one CB with a retransmission of the at least one CB.

In another configuration, the example apparatus 1602 also includes means for transmitting a configuration of a number of the multiple bits for the FI.

In another configuration, the example apparatus 1602 also includes means for transmitting the configuration in at least one of: radio resource control (RRC) signaling, a medium access control-control element (MAC-CE), sidelink control information (SCI), or downlink control information (DCI).

In another configuration, the example apparatus 1602 also includes means for transmitting a first FI for the uplink transmission using a known value when the uplink transmission is an initial uplink transmission of the one or more CBs.

In another configuration, the apparatus 1602, and in particular the cellular baseband processor 1604, includes means for receiving, from a first sidelink device and at a second sidelink device, a sidelink transmission of one or more code block (CBs) using code block groups, each code block group including one or more CBs of the sidelink transmission. The example apparatus 1602 also includes means for transmitting negative feedback for at least one CB of the sidelink transmission. The example apparatus 1602 also includes means for receiving a retransmission of the at least one CB. The example apparatus 1602 also includes means for receiving a flush indicator (FI) indicating to avoid combining a prior transmission of the at least one CB with a retransmission of the at least one CB.

In another configuration, the example apparatus 1602 also includes means for receiving a configuration of a number of the multiple bits for the FI.

In another configuration, the example apparatus 1602 also includes means for receiving the configuration in at least one of: radio resource control (RRC) signaling, a medium access control-control element (MAC-CE), sidelink control information (SCI), or downlink control information (DCI).

In another configuration, the example apparatus 1602 also includes means for receiving a first FI for the sidelink transmission using a known value when the sidelink transmission is an initial sidelink transmission of the one or more CBs.

In another configuration, the apparatus 1602, and in particular the cellular baseband processor 1604, includes means for receiving an uplink transmission of one or more code block (CBs) using code block groups, each code block group including one or more CBs of the uplink transmission. The example apparatus 1602 also includes means for transmitting negative feedback for at least one CB of the uplink transmission. The example apparatus 1602 also includes means for receiving a retransmission of the at least one CB. The example apparatus 1602 also includes means for receiving a flush indicator (FI) indicating to avoid combining a prior transmission of the at least one CB with a retransmission of the at least one CB.

In another configuration, the example apparatus 1602 also includes means for receiving a configuration of a number of the multiple bits for the FI.

In another configuration, the example apparatus 1602 also includes means for receiving the configuration in at least one of: radio resource control (RRC) signaling, a medium access control-control element (MAC-CE), sidelink control information (SCI), or downlink control information (DCI).

In another configuration, the example apparatus 1602 also includes means for receiving a first FI for the uplink transmission using a known value when the uplink transmission is an initial uplink transmission of the one or more CBs.

The aforementioned means may be one or more of the aforementioned components of the apparatus 1602 configured to perform the functions recited by the aforementioned means. As described supra, the apparatus 1602 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Aspects presented herein may improve communication between a transmitter and a receiver by providing a flush indicator in sidelink transmissions and uplink transmissions. The transmitter may be configured to transmit transmissions and to receive feedback at a transport block level, at a code block level, or at a code block group level. The flush indicator may be configured to be a single-bit field or a multi-bit field. In some examples, the flush indicator may be included in a first (or initial) transmission of one or more code blocks. The flush indicator may indicate that the receiver is to combine retransmissions of code blocks with prior transmissions of the code blocks or that the receiver is to avoid combining retransmissions of code blocks with prior transmissions of the code block.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first device, comprising: transmitting a first transmission of one or more code blocks (CBs); receiving negative feedback for at least one CB of the first transmission; retransmitting the at least one CB; and transmitting a flush indicator (FI) indicating to not combine a retransmission of the at least one CB with a prior transmission of the at least one CB.

Aspect 2 is the method of aspect 1, further including that the first transmission of the one or more code blocks is performed without generating code block groups.

Aspect 3 is the method of any of aspect 1 or aspect 2, further including that the one or more CBs of the first transmission are comprised in a transport block (TB), and wherein the negative feedback comprises hybrid automatic repeat request (HARD) negative acknowledgement (NACK) feedback.

Aspect 4 is the method of any of aspects 1 to 3, further including that the first transmission of the one or more code blocks is performed using code block groups, and wherein each code block group corresponds to one or more of the at least one CB of the first transmission.

Aspect 5 is the method of any of aspects 1 to 4, further including that the FI comprises multiple bits.

Aspect 6 is the method of any of aspects 1 to 5, further including that each of the multiple bits of the FI corresponds to a respective code block group of the first transmission.

Aspect 7 is the method of any of aspects 1 to 6, further including that a first value of an FI bit indicates to not combine the retransmission of CBs corresponding to the respective code block group, and a second value of the FI bit indicates to combine the retransmission of CBs corresponding to the respective code block group.

Aspect 8 is the method of any of aspects 1 to 7, further including: transmitting a configuration of a number of the multiple bits for the FI.

Aspect 9 is the method of any of aspects 1 to 8, further including that the configuration is transmitted in at least one of: radio resource control (RRC) signaling, a medium access control-control element (MAC-CE), or downlink control information (DCI).

Aspect 10 is the method of any of aspects 1 to 9, further including that the number of the multiple bits for the FI is based on a radio resource control (RRC) configuration and an indication in a medium access control-control element (MAC-CE) or downlink control information (DCI).

Aspect 11 is the method of any of aspects 1 to 10, further including that a first number of bits in a code block group transmission information (CBGTI) is different than a second number of the multiple bits of the FI.

Aspect 12 is the method of any of aspects 1 to 11, further including that a grouping of CBs related to the CBGTI is different than a grouping of CBs related to the FI.

Aspect 13 is the method of any of aspects 1 to 10, further including that a first number of bits in a code block group transmission information (CBGTI) is the same as a second number of the multiple bits of the FI.

Aspect 14 is the method of any of aspects 1 to 13, further including that a grouping of CBs related to the CBGTI is the same as a grouping of CBs related to the FI.

Aspect 15 is the method of any of aspects 1 to 14, further including: transmitting a first FI for the first transmission using a known value when the first transmission is an initial transmission of the one or more CBs.

Aspect 16 is the method of any of aspects 1 to 15, further including that the known value is a defined value for first transmissions and indicates no combination for the one or more CBs of the initial transmission of the one or more CBs.

Aspect 17 is the method of any of aspects 1 to 16, further including that the first device is a transmitter.

Aspect 18 is an apparatus for wireless communication including a memory and at least one processor coupled to a memory, the memory and the at least one processor configured to implement a method as in any of aspects 1 to 17.

Aspect 19 is an apparatus for wireless communication including means for implementing a method as in any of aspects 1 to 17.

Aspect 20 is a non-transitory computer-readable storage medium storing computer executable code, where the code, when executed, causes a processor to implement a method as in any of aspects 1 to 17.

Aspect 21 is a method of wireless communication at a first device, comprising: receiving a first transmission of one or more code block (CBs); transmitting negative feedback for at least one CB of the first transmission; receiving a retransmission of the at least one CB; and receiving a flush indicator (FI) indicating to not combine the retransmission of the at least one CB with a prior transmission of the at least one CB.

Aspect 22 is the method of aspect 21, further including that the first transmission of the one or more code blocks is received without receiving code block groups.

Aspect 23 is the method of any of aspect 21 or aspect 22, further including that the one or more CBs of the first transmission are comprised in a transport block (TB), and wherein the negative feedback comprises hybrid automatic repeat request (HARQ) negative acknowledgement (NACK) feedback.

Aspect 24 is the method of any of aspects 21 to 23, further including that the first transmission of the one or more code blocks is received using code block groups, and wherein each code block group corresponds to one or more of the at least one CB of the first transmission.

Aspect 25 is the method of any of aspects 21 to 24, further including that the FI comprises multiple bits.

Aspect 26 is the method of any of aspects 21 to 25, further including that each of the multiple bits of the FI corresponds to a respective code block group of the first transmission.

Aspect 27 is the method of any of aspects 21 to 26, further including that a first value of an FI bit indicates to not combine the retransmission of CBs corresponding to the respective code block group, and a second value of the FI bit indicates to combine the retransmission of CBs corresponding to the respective code block group.

Aspect 28 is the method of any of aspects 21 to 27, further including: receiving a configuration of a number of the multiple bits for the FI.

Aspect 29 is the method of any of aspects 21 to 28, further including that the configuration is received in at least one of: radio resource control (RRC) signaling, a medium access control-control element (MAC-CE), or downlink control information (DCI).

Aspect 30 is the method of any of aspects 21 to 29, further including that the number of the multiple bits for the CBGFI is based on a radio resource control (RRC) configuration and an indication in a medium access control-control element (MAC-CE) or downlink control information (DCI).

Aspect 31 is the method of any of aspects 21 to 30, further including that a first number of bits in a code block group transmission information (CBGTI) is different than a second number of the multiple bits of the FI.

Aspect 32 is the method of any of aspects 21 to 31, further including that a grouping of CBs related to the CGBTI is different than a grouping of CBs related to the FI.

Aspect 33 is the method of any of aspects 21 to 30, further including that a first number of bits in a code block group transmission information (CBGTI) is the same as a second number of the multiple bits of the FI.

Aspect 34 is the method of any of aspects 21 to 33, further including that a grouping of CBs related to the CBGTI is the same as a grouping of CBs related to the FI.

Aspect 35 is the method of any of aspects 21 to 34, further including: receiving a first FI for the first transmission using a known value when the first transmission is an initial transmission of the one or more CBs.

Aspect 36 is the method of any of aspects 21 to 35, further including that the known value is a defined value for first transmissions and indicates no combination for the one or more CBs of the initial transmission of the one or more CBs.

Aspect 37 is the method of any of aspects 21 to 36, further including that the first device is a receiver.

Aspect 38 is an apparatus for wireless communication including a memory and at least one processor coupled to a memory, the memory and the at least one processor configured to implement a method as in any of aspects 21 to 37.

Aspect 39 is an apparatus for wireless communication including means for implementing a method as in any of aspects 21 to 37.

Aspect 40 is a non-transitory computer-readable storage medium storing computer executable code, where the code, when executed, causes a processor to implement a method as in any of aspects 21 to 37.

Aspect 41 is a method of wireless communication at a first sidelink device, comprising: transmitting a sidelink transmission of one or more code blocks (CBs) using code block groups, each code block group including one or more CBs of the sidelink transmission; receiving negative feedback for at least one CB of the sidelink transmission; retransmitting the at least one CB; and transmitting a flush indicator (FI) indicating to avoid combining a prior sidelink transmission of the at least one CB with a retransmission of the at least one CB.

Aspect 42 is the method of aspect 41, further including that the one or more CBs of the sidelink transmission are comprised in a transport block (TB), and wherein the negative feedback comprises hybrid automatic repeat request (HARQ) negative acknowledgement (NACK) feedback.

Aspect 43 is the method of any of aspect 41 or aspect 42, further including that the FI comprises multiple bits.

Aspect 44 is the method of any of aspects 41 to 43, further including that each of the multiple bits of the FI corresponds to a respective code block group of the sidelink transmission.

Aspect 45 is the method of any of aspects 41 to 44, further including that a first value of an FI bit indicates to avoid combining the retransmission of the at least one CB corresponding to the respective code block group, and a second value of the FI bit indicates to combine the retransmission of the at least once CB corresponding to the respective code block group.

Aspect 46 is the method of any of aspects 41 to 45, further including: transmitting a configuration of a number of the multiple bits for the FI.

Aspect 47 is the method of any of aspects 41 to 46, further including transmitting the configuration in at least one of: radio resource control (RRC) signaling, a medium access control-control element (MAC-CE), sidelink control information (SCI), or downlink control information (DCI).

Aspect 48 is the method of any of aspects 41 to 47, further including that the number of the multiple bits for the FI is based on a radio resource control (RRC) configuration and an indication in a medium access control-control element (MAC-CE), sidelink control information (SCI), or downlink control information (DCI).

Aspect 49 is the method of any of aspects 41 to 48, further including that a first number of bits in a code block group transmission information (CBGTI) is different than a second number of the multiple bits of the FI, and wherein a grouping of CBs related to the CBGTI is different than a grouping of CBs related to the FI.

Aspect 50 is the method of any of aspects 41 to 48, further including that a first number of bits in a code block group transmission information (CBGTI) is a same number of bits as a second number of the multiple bits of the FI, and wherein a grouping of CBs related to the CBGTI is a same grouping as a grouping of CBs related to the FI.

Aspect 51 is the method of any of aspects 41 to 50, further including: transmitting a first FI for the sidelink transmission using a known value when the sidelink transmission is an initial sidelink transmission of the one or more CBs.

Aspect 52 is the method of any of aspects 41 to 51, further including that the known value is a defined value for sidelink transmissions and indicates to avoid combining the one or more CBs of the initial sidelink transmission of the one or more CBs.

Aspect 53 is an apparatus for wireless communication including a memory and at least one processor coupled to a memory, the memory and the at least one processor configured to implement a method as in any of aspects 41 to 52.

Aspect 54 is an apparatus for wireless communication including means for implementing a method as in any of aspects 41 to 52.

Aspect 55 is a non-transitory computer-readable storage medium storing computer executable code, where the code, when executed, causes a processor to implement a method as in any of aspects 41 to 52.

Aspect 56 is a method of wireless communication at a user equipment (UE), comprising: transmitting an uplink transmission of one or more code blocks (CBs) using code block groups, each code block group including one or more CBs of the uplink transmission; receiving negative feedback for at least one CB of the uplink transmission; retransmitting the at least one CB; and transmitting a flush indicator (FI) indicating to avoid combining a prior uplink transmission of the at least one CB with a retransmission of the at least one CB.

Aspect 57 is the method of aspect 56, further including that the one or more CBs of the uplink transmission are comprised in a transport block (TB), and wherein the negative feedback comprises hybrid automatic repeat request (HARQ) negative acknowledgement (NACK) feedback.

Aspect 58 is the method of any of aspect 56 or aspect 57, further including that the FI comprises multiple bits.

Aspect 59 is the method of any of aspects 56 to 58, further including that each of the multiple bits of the FI corresponds to a respective code block group of the uplink transmission.

Aspect 60 is the method of any of aspects 56 to 59, further including that a first value of an FI bit indicates to avoid combining the retransmission of the at least one CB corresponding to the respective code block group, and a second value of the FI bit indicates to combine the retransmission of the at least one CB corresponding to the respective code block group.

Aspect 61 is the method of any of aspects 56 to 60, further including: transmitting a configuration of a number of the multiple bits for the FI.

Aspect 62 is the method of any of aspects 56 to 61, further including transmitting the configuration in at least one of: radio resource control (RRC) signaling, a medium access control-control element (MAC-CE), sidelink control information (SCI), or downlink control information (DCI).

Aspect 63 is the method of any of aspects 56 to 62, further including that the number of the multiple bits for the FI is based on a radio resource control (RRC) configuration and an indication in a medium access control-control element (MAC-CE), sidelink control information (SCI), or downlink control information (DCI).

Aspect 64 is the method of any of aspects 56 to 63, further including that a first number of bits in a code block group transmission information (CBGTI) is different than a second number of the multiple bits of the FI, and wherein a grouping of CBs related to the CBGTI is different than a grouping of CBs related to the FI.

Aspect 65 is the method of any of aspects 56 to 63, further including that a first number of bits in a code block group transmission information (CBGTI) is a same number of bits as a second number of the multiple bits of the FI, and wherein a grouping of CBs related to the CBGTI is a same grouping as a grouping of CBs related to the FI.

Aspect 66 is the method of any of aspects 56 to 65, further including: transmitting a first FI for the uplink transmission using a known value when the uplink transmission is an initial uplink transmission of the one or more CBs.

Aspect 67 is the method of any of aspects 56 to 66, further including that the known value is a defined value for uplink transmissions and indicates to avoid combining the one or more CBs of the initial uplink transmission of the one or more CBs.

Aspect 68 is an apparatus for wireless communication including a memory and at least one processor coupled to a memory, the memory and the at least one processor configured to implement a method as in any of aspects 56 to 67.

Aspect 69 is an apparatus for wireless communication including means for implementing a method as in any of aspects 56 to 67.

Aspect 70 is a non-transitory computer-readable storage medium storing computer executable code, where the code, when executed, causes a processor to implement a method as in any of aspects 56 to 67.

Aspect 71 is a method of wireless communication, comprising: receiving, from a first sidelink device and at a second sidelink device, a sidelink transmission of one or more code block (CBs) using code block groups, each code block group including one or more CBs of the sidelink transmission; transmitting negative feedback for at least one CB of the sidelink transmission; receiving a retransmission of the at least one CB; and receiving a flush indicator (FI) indicating to avoid combining a prior transmission of the at least one CB with a retransmission of the at least one CB.

Aspect 72 is the method of aspect 71, further including that the one or more CBs of the sidelink transmission are comprised in a transport block (TB), and wherein the negative feedback comprises hybrid automatic repeat request (HARQ) negative acknowledgement (NACK) feedback.

Aspect 73 is the method of any of aspect 71 or aspect 72, further including that the FI comprises multiple bits.

Aspect 74 is the method of any of aspects 71 to 73, further including that each of the multiple bits of the FI corresponds to a respective code block group of the sidelink transmission.

Aspect 75 is the method of any of aspects 71 to 74, further including that a first value of an FI bit indicates to avoid combining the retransmission of the at least one CB corresponding to the respective code block group, and a second value of the FI bit indicates to combine the retransmission of the at least one CB corresponding to the respective code block group.

Aspect 76 is the method of any of aspects 71 to 75, further including: receiving a configuration of a number of the multiple bits for the FI.

Aspect 77 is the method of any of aspects 71 to 76, further including receiving the configuration in at least one of: radio resource control (RRC) signaling, a medium access control-control element (MAC-CE), sidelink control information (SCI), or downlink control information (DCI).

Aspect 78 is the method of any of aspects 71 to 77, further including that the number of the multiple bits for the FI is based on a radio resource control (RRC) configuration and an indication in a medium access control-control element (MAC-CE), sidelink control information (SCI), or downlink control information (DCI).

Aspect 79 is the method of any of aspects 71 to 78, further including that a first number of bits in a code block group transmission information (CBGTI) is different than a second number of the multiple bits of the FI, and wherein a grouping of CBs related to the CBGTI is different than a grouping of CBs related to the FI.

Aspect 80 is the method of any of aspects 71 to 78, further including that a first number of bits in a code block group transmission information (CBGTI) is a same number of bits as a second number of the multiple bits of the FI, and wherein a grouping of CBs related to the CBGTI is a same grouping as a grouping of CBs related to the FI.

Aspect 81 is the method of any of aspects 71 to 80, further including: receiving a first FI for the sidelink transmission using a known value when the sidelink transmission is an initial sidelink transmission of the one or more CBs.

Aspect 82 is the method of any of aspects 71 to 81, further including that the known value is a defined value for sidelink transmissions and indicates to avoid combining the one or more CBs of the initial sidelink transmission of the one or more CBs.

Aspect 83 is the method of any of aspects 71 to 82, further including that the second sidelink device is a receiver.

Aspect 84 is an apparatus for wireless communication including a memory and at least one processor coupled to a memory, the memory and the at least one processor configured to implement a method as in any of aspects 71 to 83.

Aspect 85 is an apparatus for wireless communication including means for implementing a method as in any of aspects 71 to 83.

Aspect 86 is a non-transitory computer-readable storage medium storing computer executable code, where the code, when executed, causes a processor to implement a method as in any of aspects 71 to 83.

Aspect 87 is a method of wireless communication at a wireless device, comprising: receiving an uplink transmission of one or more code block (CBs) using code block groups, each code block group including one or more CBs of the uplink transmission; transmitting negative feedback for at least one CB of the uplink transmission; receiving a retransmission of the at least one CB; and receiving a flush indicator (FI) indicating to avoid combining a prior transmission of the at least one CB with a retransmission of the at least one CB.

Aspect 88 is the method of aspect 87, further including that the one or more CBs of the uplink transmission are comprised in a transport block (TB), and wherein the negative feedback comprises hybrid automatic repeat request (HARQ) negative acknowledgement (NACK) feedback.

Aspect 89 is the method of any of aspect 87 or aspect 88, further including that the FI comprises multiple bits.

Aspect 90 is the method of any of aspects 87 to 89, further including that each of the multiple bits of the FI corresponds to a respective code block group of the uplink transmission.

Aspect 91 is the method of any of aspects 87 to 90, further including that a first value of an FI bit indicates to avoid combining the retransmission of the at least one CB corresponding to the respective code block group, and a second value of the FI bit indicates to combine the retransmission of the at least one CB corresponding to the respective code block group.

Aspect 92 is the method of any of aspects 87 to 91, further including: receiving a configuration of a number of the multiple bits for the FI.

Aspect 93 is the method of any of aspects 87 to 92, further including receiving the configuration in at least one of: radio resource control (RRC) signaling, a medium access control-control element (MAC-CE), sidelink control information (SCI), or downlink control information (DCI).

Aspect 94 is the method of any of aspects 87 to 93, further including that the number of the multiple bits for the FI is based on a radio resource control (RRC) configuration and an indication in a medium access control-control element (MAC-CE), sidelink control information (SCI), or downlink control information (DCI).

Aspect 95 is the method of any of aspects 87 to 94, further including that a first number of bits in a code block group transmission information (CBGTI) is different than a second number of the multiple bits of the FI, and wherein a grouping of CBs related to the CBGTI is different than a grouping of CBs related to the FI.

Aspect 96 is the method of any of aspects 87 to 94, further including that a first number of bits in a code block group transmission information (CBGTI) is a same number of bits as a second number of the multiple bits of the FI, and wherein a grouping of CBs related to the CBGTI is a same grouping as a grouping of CBs related to the FI.

Aspect 97 is the method of any of aspects 87 to 96, further including: receiving a first FI for the uplink transmission using a known value when the uplink transmission is an initial uplink transmission of the one or more CBs.

Aspect 98 is the method of any of aspects 87 to 97, further including that the known value is a defined value for uplink transmissions and indicates to avoid combining the one or more CBs of the initial uplink transmission of the one or more CBs.

Aspect 99 is an apparatus for wireless communication including a memory and at least one processor coupled to a memory, the memory and the at least one processor configured to implement a method as in any of aspects 87 to 98.

Aspect 100 is an apparatus for wireless communication including means for implementing a method as in any of aspects 87 to 98.

Aspect 101 is a non-transitory computer-readable storage medium storing computer executable code, where the code, when executed, causes a processor to implement a method as in any of aspects 87 to 98.

What is claimed is:

1. An apparatus for wireless communication at a first sidelink device, comprising:
   a memory; and
   at least one processor coupled to the memory, the memory and the at least one processor configured to:
   transmit a sidelink transmission of one or more code blocks (CBs) using code block groups, each code block group including at least one of the one or more CBs of the sidelink transmission;
   receive negative feedback for at least one CB of the sidelink transmission;
   retransmit the at least one CB; and
   transmit a flush indicator (FI) indicating to avoid combining a prior sidelink transmission of the at least one CB with a retransmission of the at least one CB.

2. The apparatus of claim 1, wherein the one or more CBs of the sidelink transmission are comprised in a transport block (TB), and wherein the negative feedback comprises hybrid automatic repeat request (HARQ) negative acknowledgement (NACK) feedback.

3. The apparatus of claim 1, wherein the FI comprises multiple bits.

4. The apparatus of claim 3, wherein each of the multiple bits of the FI corresponds to a respective code block group of the sidelink transmission.

5. The apparatus of claim 4, wherein a first value of an FI bit indicates to avoid combining the retransmission of the at least one CB corresponding to the respective code block group, and a second value of the FI bit indicates to combine the retransmission of the at least one CB corresponding to the respective code block group.

6. The apparatus of claim 3, wherein the memory and the at least one processor are further configured to:
   transmit a configuration of a number of the multiple bits for the FI.

7. The apparatus of claim 6, wherein the memory and the at least one processor are further configured to transmit the configuration in at least one of:
   radio resource control (RRC) signaling,
   a medium access control-control element (MAC-CE),
   sidelink control information (SCI), or
   downlink control information (DCI).

8. The apparatus of claim 6, wherein the number of the multiple bits for the FI is based on a radio resource control (RRC) configuration and an indication in a medium access control-control element (MAC-CE), sidelink control information (SCI), or downlink control information (DCI).

9. The apparatus of claim 3, wherein a first number of bits in a code block group transmission information (CBGTI) is different than a second number of the multiple bits of the FI, and wherein a first grouping of CBs related to the CBGTI is different than a second grouping of CBs related to the FI.

10. The apparatus of claim 3, wherein a first number of bits in a code block group transmission information (CBGTI) is a same number of bits as a second number of the multiple bits of the FI, and wherein a first grouping of CBs related to the CBGTI is a same grouping as a second grouping of CBs related to the FI.

11. The apparatus of claim 1, wherein the memory and the at least one processor are further configured to:
   transmit a first FI for the sidelink transmission using a known value when the sidelink transmission is an initial sidelink transmission of the one or more CBs.

12. The apparatus of claim 11, wherein the known value is a defined value for sidelink transmissions and indicates to avoid combining the one or more CBs of the initial sidelink transmission of the one or more CBs.

13. An apparatus for wireless communication at a user equipment (UE), comprising:
   a memory; and
   at least one processor coupled to the memory, the memory and the at least one processor configured to:

transmit an uplink transmission of one or more code blocks (CBs) using code block groups, each code block group including at least one of the one or more CBs of the uplink transmission;
receive negative feedback for at least one CB of the uplink transmission;
retransmit the at least one CB; and
transmit a flush indicator (FI) indicating to avoid combining a prior uplink transmission of the at least one CB with a retransmission of the at least one CB.

14. The apparatus of claim 13, wherein the one or more CBs of the uplink transmission are comprised in a transport block (TB), and wherein the negative feedback comprises hybrid automatic repeat request (HARQ) negative acknowledgement (NACK) feedback.

15. The apparatus of claim 13, wherein the FI comprises multiple bits.

16. The apparatus of claim 15, wherein each of the multiple bits of the FI corresponds to a respective code block group of the uplink transmission.

17. An apparatus for wireless communication, comprising:
a memory; and
at least one processor coupled to the memory, the memory and the at least one processor configured to:
receive, from a first sidelink device and at a second sidelink device, a sidelink transmission of one or more code block (CBs) using code block groups, each code block group including at least one of the one or more CBs of the sidelink transmission;
transmit negative feedback for at least one CB of the sidelink transmission;
receive a retransmission of the at least one CB; and
receive a flush indicator (FI) indicating to avoid combining a prior transmission of the at least one CB with the retransmission of the at least one CB.

18. The apparatus of claim 17, wherein the one or more CBs of the sidelink transmission are comprised in a transport block (TB), and wherein the negative feedback comprises hybrid automatic repeat request (HARQ) negative acknowledgement (NACK) feedback.

19. The apparatus of claim 17, wherein the FI comprises multiple bits.

20. The apparatus of claim 19, wherein each of the multiple bits of the FI corresponds to a respective code block group of the sidelink transmission.

21. The apparatus of claim 20, wherein a first value of an FI bit indicates to avoid combining the retransmission of the at least one CB corresponding to the respective code block group, and a second value of the FI bit indicates to combine the retransmission of the at least one CB corresponding to the respective code block group.

22. The apparatus of claim 19, wherein the memory and the at least one processor are further configured to:
receive a configuration of a number of the multiple bits for the FI.

23. The apparatus of claim 19, wherein a first number of bits in a code block group transmission information (CBGTI) is different than a second number of the multiple bits of the FI, and wherein a first grouping of CBs related to the CBGTI is different than a second grouping of CBs related to the FI.

24. The apparatus of claim 19, wherein a first number of bits in a code block group transmission information (CBGTI) is a same number of bits as a second number of the multiple bits of the FI, and wherein a first grouping of CBs related to the CBGTI is a same grouping as a second grouping of CBs related to the FI.

25. The apparatus of claim 17, wherein the memory and the at least one processor are further configured to:
receive a first FI for the sidelink transmission using a known value when the sidelink transmission is an initial sidelink transmission of the one or more CBs.

26. The apparatus of claim 25, wherein the known value is a defined value for sidelink transmissions and indicates to avoid combining the one or more CBs of the initial sidelink transmission of the one or more CBs.

27. An apparatus for wireless communication at a wireless device, comprising:
a memory; and
at least one processor coupled to the memory, the memory and the at least one processor configured to:
receive an uplink transmission of one or more code block (CBs) using code block groups, each code block group including at least one of the one or more CBs of the uplink transmission;
transmit negative feedback for at least one CB of the uplink transmission;
receive a retransmission of the at least one CB; and
receive a flush indicator (FI) indicating to avoid combining a prior transmission of the at least one CB with the retransmission of the at least one CB.

28. The apparatus of claim 27, wherein the one or more CBs of the uplink transmission are comprised in a transport block (TB), and wherein the negative feedback comprises hybrid automatic repeat request (HARQ) negative acknowledgement (NACK) feedback.

29. The apparatus of claim 27, wherein the FI comprises multiple bits.

30. The apparatus of claim 29, wherein each of the multiple bits of the FI corresponds to a respective code block group of the uplink transmission.

* * * * *